(12) United States Patent
Boesch et al.

(10) Patent No.: US 12,139,929 B2
(45) Date of Patent: Nov. 12, 2024

(54) REFUSE CARTS WITH RETENTION CORRAL

(71) Applicant: TBI Engineering and Design, LLC, Otsego, MN (US)

(72) Inventors: Timothy Boesch, Otsego, MN (US); Travis Boesch, Burnsville, MN (US)

(73) Assignee: TBI Engineering and Design, LLC, Otsego, MN (US)

( * ) Notice: Subject to any disclaimer, the term of this patent is extended or adjusted under 35 U.S.C. 154(b) by 0 days.

(21) Appl. No.: 18/104,267

(22) Filed: Jan. 31, 2023

(65) Prior Publication Data

US 2023/0243181 A1 Aug. 3, 2023

Related U.S. Application Data

(60) Provisional application No. 63/304,770, filed on Jan. 31, 2022.

(51) Int. Cl.
*E04H 17/18* (2006.01)
*B62B 3/00* (2006.01)
(Continued)

(52) U.S. Cl.
CPC .............. *E04H 17/18* (2013.01); *B62B 3/00* (2013.01); *B65F 3/005* (2013.01); *E04H 1/1205* (2013.01)

(58) Field of Classification Search
CPC . B62B 2203/07; B62B 2202/20; B62B 3/104; B62B 1/264; B62B 3/04; B62B 1/18; B62B 3/004; B62B 3/1476; B62B 5/0079; B62B 3/00; B62B 1/00; B62B 3/005; B62B 1/002; B62B 1/008; B62B 1/22; B62B 1/26; B62B 2205/006; B62B 2205/20; B62B 3/02; B62B 5/0089; B60Y 2200/62; B65F 1/1473; B65F 1/468; B65F 1/1452; B65F 1/00; B65F 3/00; B65F 2210/00;
(Continued)

(56) References Cited

U.S. PATENT DOCUMENTS 3,028,015 A * 4/1962 Williams .............. B65F 1/1421
211/83
5,035,445 A * 7/1991 Poulin ...................... B60T 1/14
280/79.11
(Continued)

FOREIGN PATENT DOCUMENTS

CN 112298873 A * 2/2021 ............... A61L 2/18
CN 112357414 A * 2/2021 .............. B65F 3/005
(Continued)

*Primary Examiner* — James A Shriver, II
*Assistant Examiner* — Hilary L Johns
(74) *Attorney, Agent, or Firm* — Husch Blackwell

(57) ABSTRACT

Refuse carts and refuse cart retention systems for use in retaining refuse carts inside a corral and transporting or emptying the carts when needed. The refuse cart retention system generally includes a retention corral and at least one large refuse cart and/or at least one small refuse cart. Various mechanisms for retaining refuse carts in the retention corral include retention structures to receive a segment of a refuse cart frame, and frame protrusions connected to the retention corral that can be placed in tight contact with a cutout in the sides of the refuse carts having a geometry substantially identical to that of the frame protrusions.

14 Claims, 25 Drawing Sheets

(51) Int. Cl.
*B65F 3/00* (2006.01)
*E04H 1/12* (2006.01)

(58) Field of Classification Search
CPC .. B65F 2230/00; B65F 1/1426; B65F 1/1468; B65F 1/1615; B65F 1/163; B65F 2210/18; B65F 3/005; B65F 2210/172; B65F 1/141; B65F 2001/1676; Y02T 10/70; B60P 1/6418; B60P 1/43; E04H 17/18; E04H 1/1205
USPC .................................................... 280/47.34
See application file for complete search history.

(56) References Cited

U.S. PATENT DOCUMENTS

| | | | |
|---|---|---|---|
| 5,320,475 A * | 6/1994 | Pinder | B62B 3/02 |
| | | | 414/467 |
| 5,704,625 A * | 1/1998 | Presnell | B60D 1/483 |
| | | | 280/79.5 |
| 6,138,855 A * | 10/2000 | Kopf | B65F 1/1623 |
| | | | 220/826 |
| 7,232,136 B2 * | 6/2007 | Sheehan | B65F 1/1473 |
| | | | 280/47.35 |
| 7,780,026 B1 * | 8/2010 | Zuckerman | B65D 21/0223 |
| | | | 206/508 |
| 7,866,679 B1 * | 1/2011 | Leon | B65F 1/1426 |
| | | | 280/79.5 |
| 8,408,564 B2 * | 4/2013 | Hutchinson | B62B 3/04 |
| | | | 280/79.5 |
| 10,099,710 B1 * | 10/2018 | Costa | B62B 1/008 |
| 10,137,918 B2 * | 11/2018 | Mellon | B62B 3/104 |
| 10,494,171 B2 | 12/2019 | Lavoie | |
| 10,857,925 B1 * | 12/2020 | Sahota | G05D 1/0011 |
| 11,420,820 B2 * | 8/2022 | Panu | B62B 3/04 |
| 2006/0284391 A1 * | 12/2006 | Sheehan | B65F 1/1473 |
| | | | 280/47.35 |
| 2008/0150246 A1 * | 6/2008 | Lox | B62B 1/18 |
| | | | 280/47.34 |
| 2009/0206569 A1 * | 8/2009 | Begin | B62B 3/04 |
| | | | 280/47.35 |
| 2013/0113171 A1 * | 5/2013 | Pennings | B62B 3/004 |
| | | | 206/438 |
| 2016/0107834 A1 | 4/2016 | Adams et al. | |
| 2017/0072979 A1 * | 3/2017 | Mellon | B62B 3/104 |
| 2019/0152503 A1 * | 5/2019 | Crowley, Jr. | B62B 5/0006 |
| 2020/0062498 A1 | 2/2020 | Derderian | |
| 2021/0253347 A1 * | 8/2021 | Pung | B65F 3/10 |

FOREIGN PATENT DOCUMENTS

| | | |
|---|---|---|
| DE | 2020004009328 U1 | 10/2004 |
| DE | 102010033677 A1 | 2/2012 |
| DE | 202014003616 U1 | 6/2015 |
| WO | 2020176979 A1 | 9/2020 |

* cited by examiner

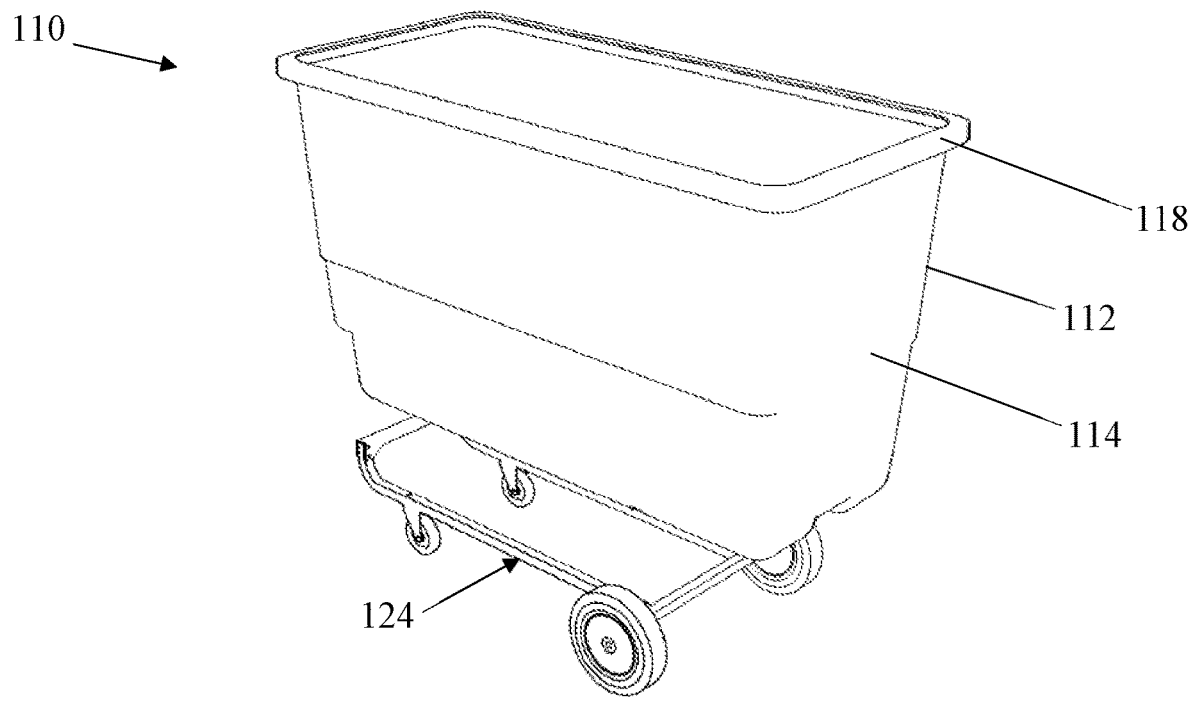
FIG. 2A
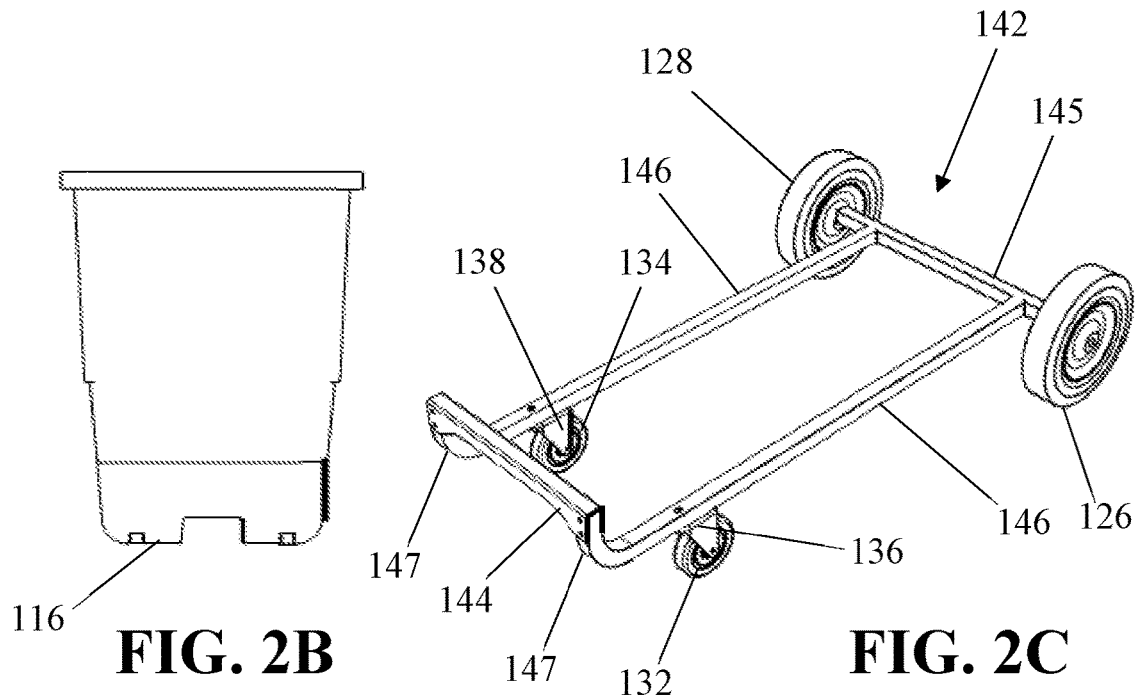
FIG. 2B
FIG. 2C

REFUSE CARTS WITH RETENTION CORRAL

CROSS-REFERENCE TO RELATED APPLICATION

This application claims the benefit of Provisional Application No. 63/304,770, filed Jan. 31, 2022, titled "Refuse Carts With Retention Corral," the disclosure of which is hereby incorporated by reference in its entirety.

TECHNICAL FIELD

The present disclosure relates generally to refuse carts and associated retention apparatuses. More specifically, the present disclosure relates to refuse carts with an associated retention corral wherein at least one refuse cart is retained within the retention corral through various retention mechanisms.

BACKGROUND

Refuse carts are used in various settings including restaurants, manufacturing facilities, office buildings, and airports to collect garbage and other types of waste in a safe and sanitary manner. These carts often have wheels that allow accumulated waste to be transported from one location to another, and generally can fit through the commercial sized doors found in most settings. Additionally, refuse carts typically have a lid which prevents waste from falling out and limits the spread of odors emanating from the waste. This creates a suitable method for accumulating waste in the short-term before it is transported to a larger dumpster. Waste can be accumulated directly into the refuse carts or collected from smaller waste bins when these bins become filled with waste.

When a refuse cart becomes filled to capacity, it is generally transported by one or more persons to a location that has a dumpster suitable for accumulating large amounts of waste. From there, the one or more persons typically remove the waste from the refuse cart by either picking it out by hand and depositing it into the dumpster, or by lifting the refuse cart up to a point above the height of the dumpster and tilting the refuse cart far enough forward to allow the waste to slide out of the refuse cart and into the dumpster. The first method of depositing waste is both unsanitary and time consuming for the person(s) involved, while the second method is dangerous and places the person(s) in a position that makes them prone to injury. Additionally, if the refuse cart is tilted too far forward while depositing waste with the second method, it may inadvertently fall into the dumpster thus requiring the person(s) involved to climb into the dumpster and lift the refuse cart out. These issues are multiplied when there are several refuse carts being used at the same time as is typical in settings involving many sources of waste production such as manufacturing facilities and airports.

A need exists in the industry for an improved system of transporting waste from refuse carts to dumpsters that is less time intensive and safer for the persons involved in the transporting process.

SUMMARY

Disclosed herein are embodiments of refuse carts and refuse cart retention systems for use in retaining refuse carts inside a corral and transporting or emptying the carts when needed. The refuse cart retention system generally includes a retention corral and at least one large refuse cart and/or at least one small refuse cart. Embodiments disclose various mechanisms for retaining refuse carts in the retention corral, including retention structures configured to receive a segment of a refuse cart frame, an adjustable yoke that can tightly grip lids connected to the refuse carts, wheel pockets configured to receive rear wheels of the refuse carts, a strap and handle combination, an upper retaining bar which extends across the length of the retention corral and can be placed in tight contact with the refuse carts, frame protrusions connected to the retention corral that can be placed in tight contact with a cutout in the sides of the refuse carts having a geometry substantially identical to that of the frame protrusions, and door protrusions connected to a set of swinging doors attached to the retention corral that can be placed in tight contact with a cutout in the front of the refuse carts having a geometry substantially identical to that of the door protrusions. Additional embodiments disclose various lid and enclosure configurations of the refuse cart retention system, and various groupings of large and small refuse carts inside the retention corral.

In one aspect, the present disclosure provides a retention corral for a refuse cart, the corral comprising a base, a first side fixture and a second side fixture arranged on opposing sides of the base, a fork pocket coupled to each side fixture, the fork pockets configured to allow the corral to be lifted by a front load refuse truck, a cart retention structure coupled to a top surface of the base at a location between the first side fixture and the second side fixture, the cart retention structure configured to selectively receive a portion of a refuse cart, and a foot pedal coupled to the cart retention structure, the foot pedal movable between an open position and a closed position, wherein in the closed position the foot pedal is configured to secure the refuse cart to the retention structure.

In one aspect, the present disclosure provides a refuse cart system, comprising a refuse cart including a frame, a bin coupled to the frame, and a wheel, and a retention corral. The retention corral includes a base, a first side fixture and a second side fixture arranged on opposing sides of the base, a fork pocket coupled to each side fixture, the fork pockets configured to allow the corral to be lifted by a front load refuse truck, a cart retention structure coupled to a top surface of the base at a location between the first side fixture and the second side fixture, the cart retention structure configured to selectively receive a portion of the refuse cart, and a foot pedal coupled to the cart retention structure, the foot pedal movable between an open position and a closed position, wherein in the closed position the foot pedal is configured to secure the refuse cart to the retention structure In one aspect, the present disclosure provides a refuse cart retention corral, comprising a base plate, a first side fixture and a second side fixture coupled to opposing sides of the base plate, the first and second side fixtures each having a pair of brackets coupled to an inward-facing surface, a fork pocket coupled to an outward-facing surface of each side fixture, one or more dividers positioned between the first side fixture and the second side fixture and coupled to a top surface of the base plate, and an I-bar coupled to a top surface of each of the one or more dividers. Each I-bar is configured to receive a first portion of a refuse cart, and the pair of brackets is configured to receive a second portion of the refuse cart.

In one aspect, the present disclosure provides a refuse cart retention corral, comprising a base plate, a first side fixture and a second side fixture coupled to opposing sides of the base plate, a middle fixture coupled to the base plate at a location equidistant from each of the first and second side fixtures, a fork pocket coupled to an outward-facing surface of each side fixture, a first retention structure coupled to a top surface of the base plate at a location between the first side fixture and the middle fixture, a second retention structure coupled to a top surface of the base plate at a location between the second side fixture and the middle fixture, a foot pedal coupled to each of the first retention structure and the second retention structure, and a refuse cart locking mechanism coupled to the middle fixture, the refuse cart locking mechanism movable between a locked position and an unlocked position. The first retention structure and the second retention structure are each configured to receive a portion of a refuse cart frame, and each foot pedal is configured to secure the portion of the refuse cart frame to the retention structure and to release the portion of the refuse cart frame from the retention structure when an external force is applied to the foot pedal.

In one aspect, the present disclosure provides a refuse cart retention system, comprising one or more refuse carts each having a cart bin including a container with an upper lip, the cart bin coupled to a cart mount including a plurality of wheels attached to a frame, and a retention corral. The retention corral includes a base plate, a first side fixture and a second side fixture coupled to opposing sides of the base plate, a middle fixture coupled to the base plate at a location equidistant from each of the first and second side fixtures, a fork pocket coupled to an outward-facing surface of each side fixture, a first retention structure coupled to a top surface of the base plate at a location between the first side fixture and the middle fixture, a second retention structure coupled to a top surface of the base plate at a location between the second side fixture and the middle fixture, a foot pedal coupled to each of the first retention structure and the second retention structure, and a refuse cart locking mechanism coupled to the middle fixture, the refuse cart locking mechanism movable between a locked position and an unlocked position. The first retention structure and the second retention structure are each configured to receive a portion of the frame of the cart mount, and the foot pedal is configured to secure the portion of the frame of the cart mount to the corresponding retention structure and to release the portion of the frame from the corresponding retention structure when an external force is applied to the foot pedal.

In one aspect, the present disclosure provides a refuse cart retention corral, comprising a base plate, a first side fixture and a second side fixture coupled to opposing sides of the base plate, the first and second side fixtures each having a pair of brackets coupled to an inward-facing surface, a fork pocket coupled to an outward-facing surface of each side fixture, one or more dividers positioned between the first side fixture and the second side fixture and coupled to a top surface of the base plate, and an I-bar coupled to a top surface of each of the one or more dividers. Each I-bar is configured to receive a first portion of a refuse cart, and the pair of brackets is configured to receive a second portion of the refuse cart.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 2A is an exploded view of a large refuse cart, according to an embodiment of the disclosure.

FIG. 2B is a back view of a cart bin of a large refuse cart, according to an embodiment of the disclosure.

FIG. 2C is an isometric view of a cart mount, according to an embodiment of the disclosure.

Figure 1A:
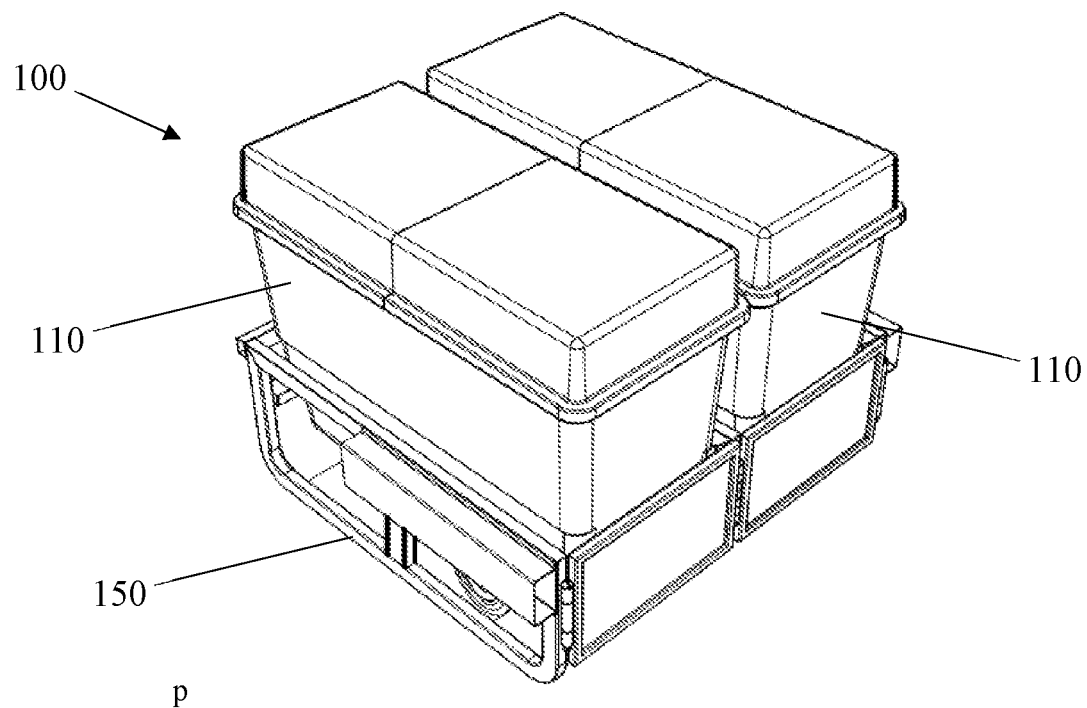
FIG. 1A is an isometric view of a refuse cart retention system operating in a retained position, according to an embodiment of the disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIGS. 1A-3B, a refuse cart retention system 100 comprising one or more large refuse carts 110 and a retention corral 150 is depicted. The refuse cart retention system 100 can operate in a retained position, depicted in FIG. 1A for example, where the one or more large refuse carts 110 are locked into the retention corral 150 until an external force intervenes, or a transition position where the one or more large refuse carts 110 are not locked into the retention corral 150 and are either entering or exiting the retention corral 150. External forces which can alternate the refuse cart retention system 100 from the retained position to the transition position, or vice versa, include but are not limited to a person, a vehicle, a robot, or a combination of those described. For example, a person may operate a vehicle or a robot to change the position of the refuse cart retention system 100.

Figure 1B:
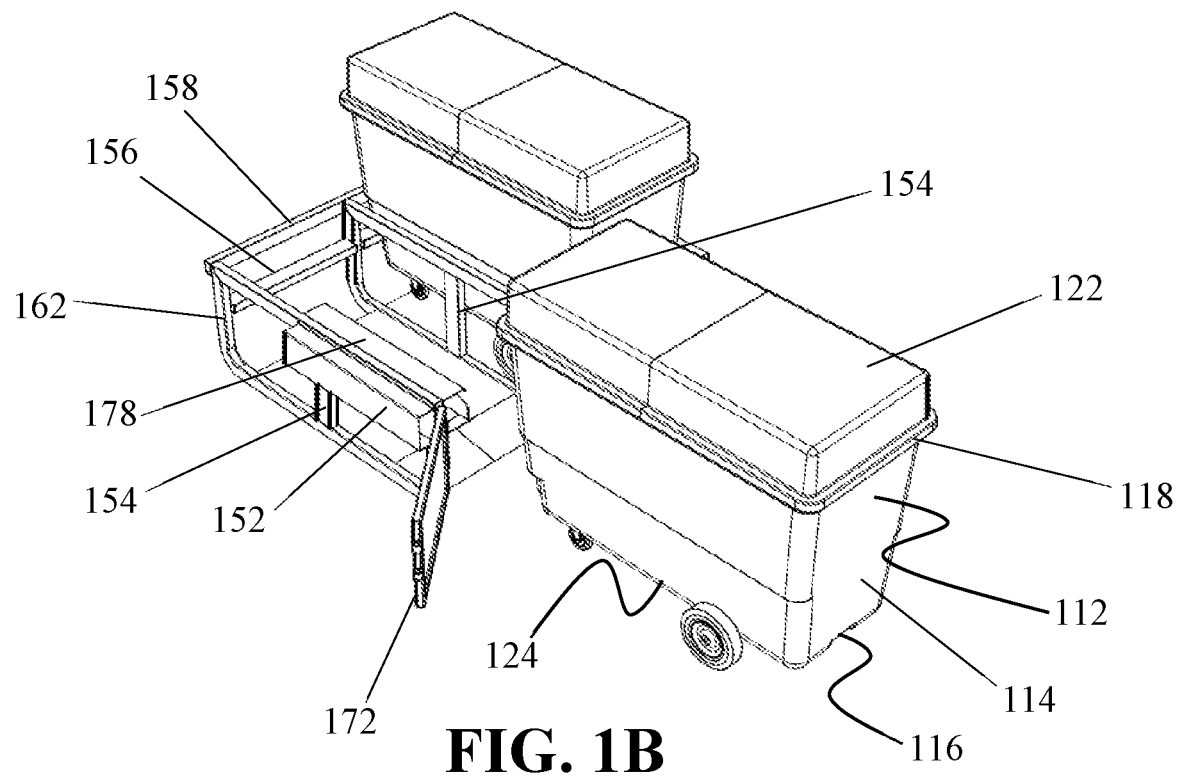
FIG. 1B is an isometric view of a refuse cart retention system operating in a transition position, according to an embodiment of the disclosure.
Figure 1C:
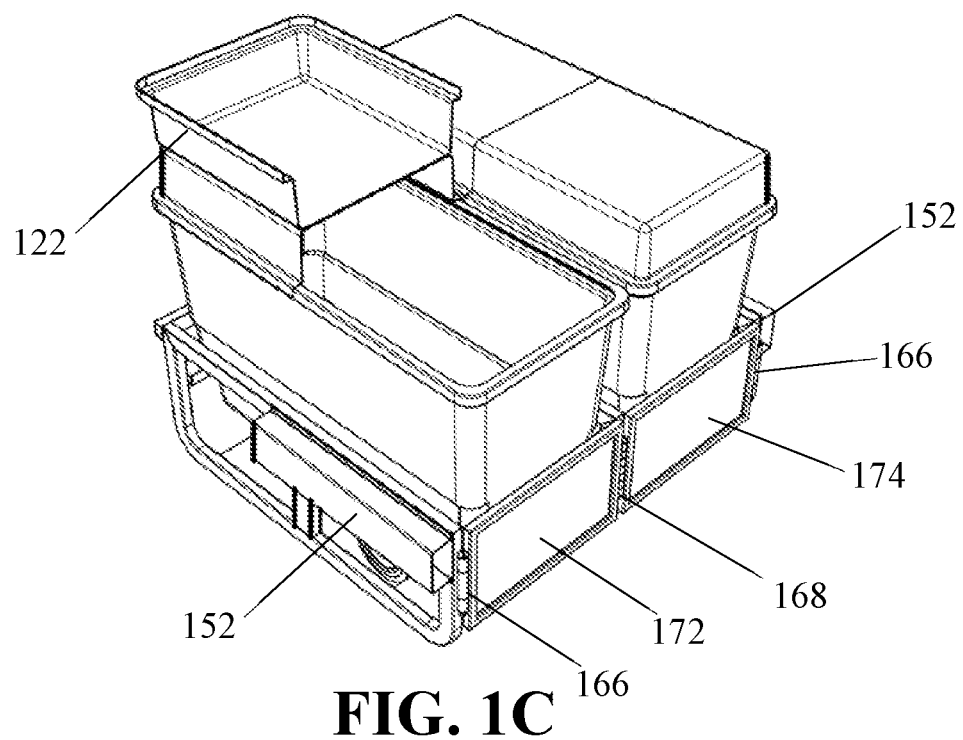
FIG. 1C is an isometric view of a refuse cart retention system with a large lid of a large refuse cart in an open position, according to an embodiment of the disclosure.
Figure 1D:
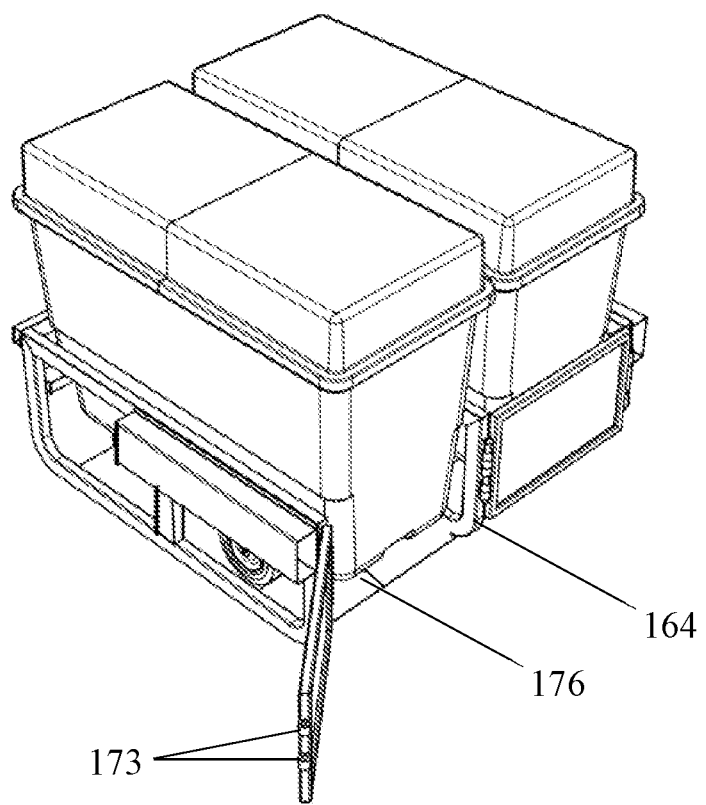
FIG. 1D is an isometric view of a refuse cart retention system with a large lid of a large refuse cart in a closed position, according to an embodiment of the disclosure.

Referring now to FIG. 1B, refuse cart retention system 100 is depicted in the transition position. Large refuse cart 110 can comprise a cart bin 112 and a cart mount 124. Cart bin 112 can be slidably couplable to cart mount 124 to form large refuse cart 110. Cart bin 112 generally comprises container 114, bottom surface 116, upper lip 118, and large lid 122. Container 114 can define a containment portion therein such that waste material can be received and stored in a safe and sanitary manner. Bottom surface 116 can be in direct contact with cart mount 124 thus connecting container 114, upper lip 118, and large lid 122 to cart mount 124 and forming large refuse cart 110. Upper lip 118 can be fixedly couplable to container 114 and can extend outward in all directions beyond an outer perimeter of container 114. Upper lip 118 can be configured to receive large lid 122 such that an outer-facing perimeter of upper lip 118 can be placed in direct contact with an inner-facing perimeter of large lid 122. Large lid 122 can be securely couplable to upper lip 118 such that it can generally only be removed by an external force. Large lid 122 can act as a cover for container 114, thus preventing waste from falling out and limiting the spread of odors. Large lid 122 can be hingedly connected at a midpoint which allows a front half portion of large lid 122 to be lifted upwards by an external force which exposes the inside of container 114 and allows waste to be moved from container 114 to a different location. A rear half portion of large lid 122 typically remains fixedly closed while the front half portion of large lid 122 can be lifted upwards. Cart bin 112 can be made of various materials including metals, wood, plastic, or other materials suitable for receiving and storing waste material.

Retention corral 150 may comprise one or more fork pockets 152, one or more vertical beams 154, one or more horizontal beams 156, a support connector 158, one or more side fixtures 162, a middle fixture 164, one or more side hinges 166, a first swinging door 172, a second swinging door 174, a door lock 168, one or more base plates 176, and one or more retention structures 178. Each fork pocket 152 can be securely couplable to an outer-facing surface of side fixture 162. Fork pocket 152 generally has a substantially rectangular geometry with a rectangular aperture extending along a length of the fork pocket 152 such that a fork from a vehicle can be inserted into the fork pocket 152, thus securely coupling the vehicle to the retention corral 150. Vertical beam 154 can be fixedly couplable to a top portion and a bottom portion of side fixture 162. Vertical beam 154 typically connects the top and bottom portions of side fixture 162 which provides structural stability to side fixture 162. Vertical beam 154 generally has a substantially rectangular geometry and generally is positioned substantially towards a horizontal midpoint of side fixture 162 to maximize structural support.

Horizontal beam 156 can be fixedly couplable to a rear surface of side fixture 162 and a rear surface of middle fixture 164, thus connecting side fixture 162 and middle fixture 164 together. Horizontal beam 156 can provide structural stability to retention corral 150 by connecting one or more side fixtures 162 together with middle fixture 164. Horizontal beam 156 generally has a substantially rectangular geometry and is generally positioned substantially towards a vertical midpoint of both side fixture 162 and middle fixture 164 to maximize structural support. Support connector 158 generally has a substantially rectangular geometry and extends horizontally along the rear of retention corral 150. Generally, a rectangular aperture extends along the length of support connector 158 to reduce the weight of retention corral 150. Support connector 158 can be fixedly couplable to side fixtures 162 and middle fixture 164, thus providing an additional connection between the fixtures 162, 164.

Side fixtures 162 generally have rectangular-shaped tubing formed in an extended U-shape with another rectangular tube connecting each end of the extended U-shape together. As described, side fixtures 162 can be fixedly couplable with fork pockets 152, vertical beams 154, horizontal beams 156, and support connector 158. When large refuse cart 110 is in the retained position, one surface of side fixture 162 typically faces large refuse cart 110 directly while the other surface typically faces away from large refuse cart 110 towards open space. Middle fixture 164 can be shaped substantially identical to side fixtures 162 and can be positioned a distance from side fixture 162. When two large refuse carts 110 are both in the retained position, one surface of middle fixture 164 typically faces towards one refuse cart 110 directly while the other typically faces towards the other refuse cart 110 directly.

Each side hinge 166 can be fixedly couplable to a side fixture 162 and either first swinging door 172 or second swinging door 174. Doors 172, 174 can be hingedly couplable to side fixtures 162 via side hinges 166. Doors 172, 174 can be configured to alternate between an open position and a closed position when acted upon by an external force such as those previously described. When moving from the closed position to the open position, first swinging door 172 generally rotates in a clockwise direction while second swinging door 174 generally rotates in a counterclockwise direction, both as seen from above. Both first swinging door 172 and second swinging door 174 can include one or more lock grips 173 which can operably couple to door lock 168 when doors 172, 174 are in the closed position. Lock grip 173 generally has a substantially cylindrical geometry with a circular aperture extending along a length of lock grip 173, and can be fixedly couplable to doors 172, 174. Door lock 168 can be fixedly couplable to middle fixture 164 and operably couplable to lock grips 173 of doors 172, 174. Door lock 168 generally has a substantially cylindrical geometry with a plurality of thinned segments that can receive lock grips 173.

Base plate 176 can be fixedly couplable to side fixture 162 and middle fixture 164 and can be configured to receive large refuse cart 110. Base plate 176 typically has a sloped front portion starting at a front end of side fixture 162 followed by a linear portion parallel to a length of side fixture 162 and extending to a rear end of side fixture 162.

Retention structure 178 is generally substantially rectangular in geometry and generally has a substantially rectangular aperture extending along a length of retention structure 178. Retention structure 178 can be fixedly couplable to a top surface of base plate 176 and can be positioned along a midpoint of the linear portion of base plate 176 in a direction perpendicular to horizontal beam 156. Retention structure 178 typically has cutouts configured to receive a rear segment 145 of a frame 142 that connects a first large rear wheel 126 to a second large rear wheel 128 in cart mount 124. When frame 142 is received by retention structure 178, the large refuse cart 110 typically becomes locked in place until altered by an external force. Retention corral 150 can be made of various materials including metals, wood, plastic, or other materials suitable for receiving one or more large refuse carts 110.

Figure 1E:
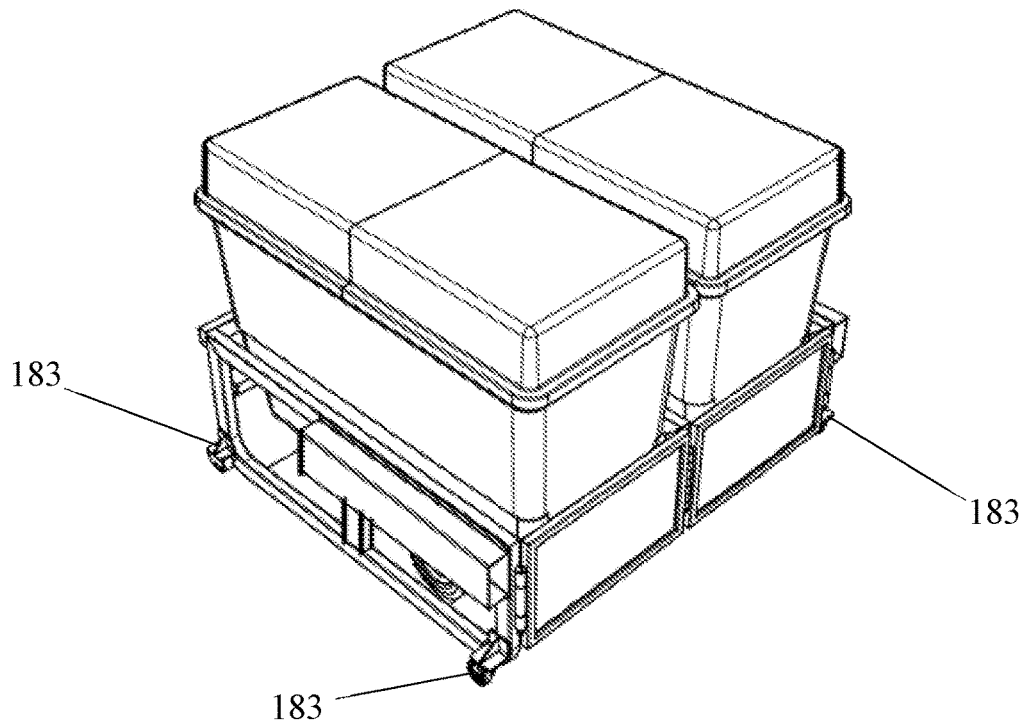
FIG. 1E is an isometric view of a refuse cart retention system having a plurality of casters, according to an embodiment of the disclosure.

Referring now to the embodiment of FIG. 1E, retention corral 150 may optionally include a plurality of casters 183 each fixedly couplable to side fixtures 162. Casters 183 generally allow refuse cart retention system 100 to be rolled from one location to another by an external force, thus creating an alternative transportation method.

Figure 1F:
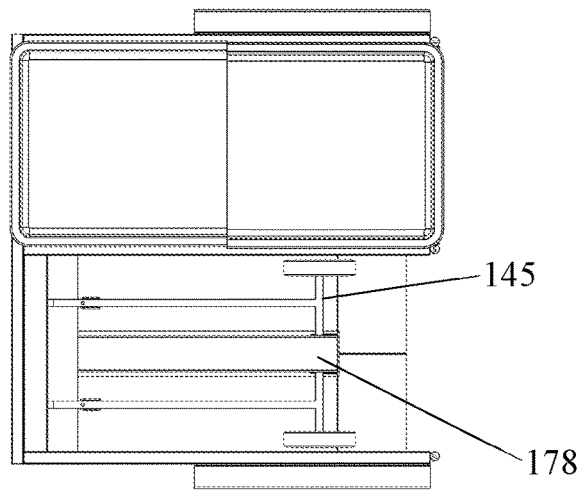
FIG. 1F is a top view of a refuse cart retention system, according to an embodiment of the disclosure.
Figure 1G:
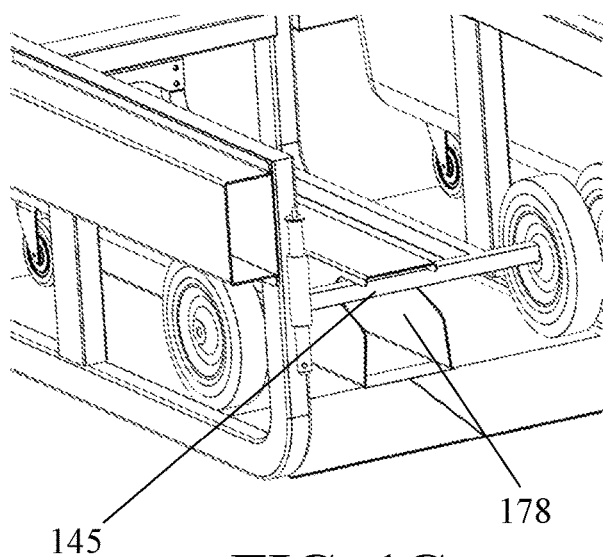
FIG. 1G is an isometric view of a refuse cart retention system showing a retention mechanism, according to an embodiment of the disclosure.

Referring now to FIGS. 1F and 1G, rear segment 145 of frame 142 can be retained by retention structure 178.

Referring now to FIG. 2A, large refuse cart 110 can comprise cart bin 112 and cart mount 124. Referring now to FIGS. 2A and 2B, cart bin 112 as depicted comprises container 114, bottom surface 116, and upper lip 118.

Referring now to FIG. 2C, cart mount 124 comprises first large rear wheel 126, second large rear wheel 128, a first front wheel 132, a second front wheel 134, a first wheel connector 136, a second wheel connector 138, frame 142, and a support bracket 148. First large rear wheel 126 and second large rear wheel 128 can be fixedly couplable to a rear segment 145 of frame 142. First front wheel 132 and second front wheel 134 can also be fixedly couplable to a middle segment 146 of frame 142 via first wheel connector 136 and second wheel connector 138, respectively. Frame 142 can include a front crossmember 144 and a rear crossmember 145. Frame 142 can include curved segments 147 which support bracket 148 connects to via a connecting mechanism which may include fasteners. Although not depicted, it will be understood that with cart 110 positioned in corral 150, front crossmember 144 is arranged under horizontal beam 156 of corral 150, so as to secure the front of cart 110 with respect to corral 150.

Figure 2D:
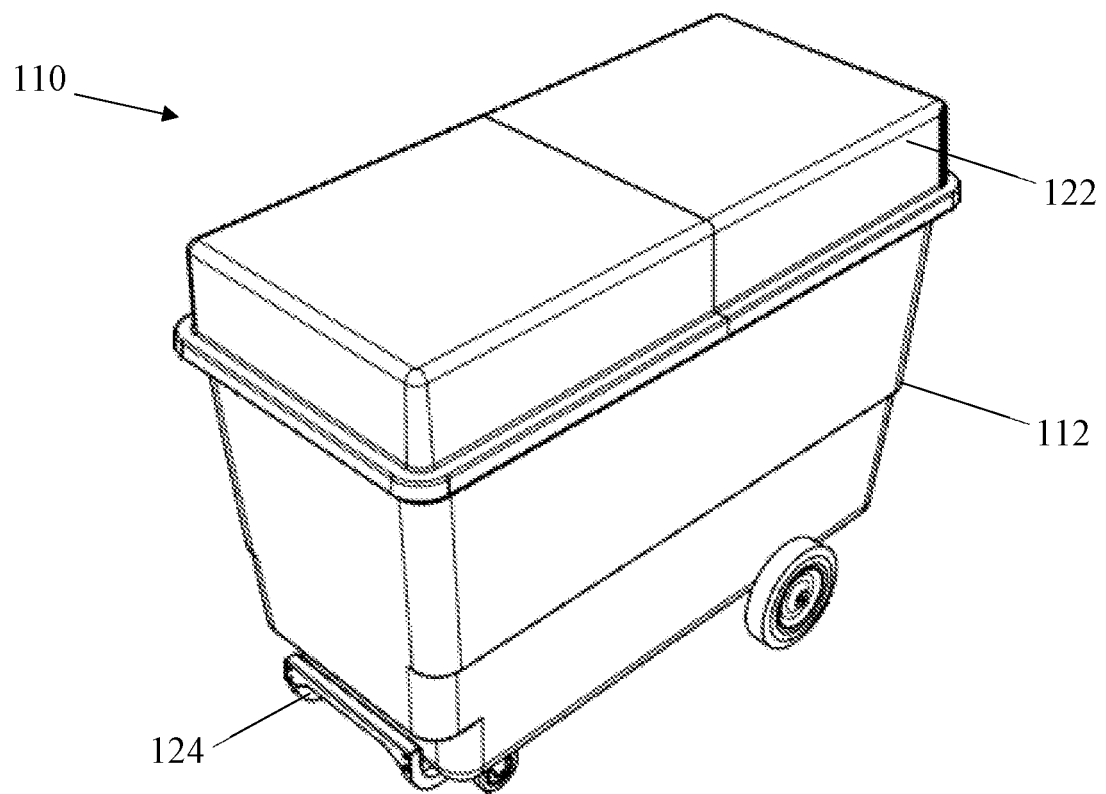
FIG. 2D is an isometric view of a large refuse cart with a large lid attached, according to an embodiment of the disclosure.

Referring now to FIG. 2D, large refuse cart 110 can optionally comprise large lid 122.

Figure 3A:
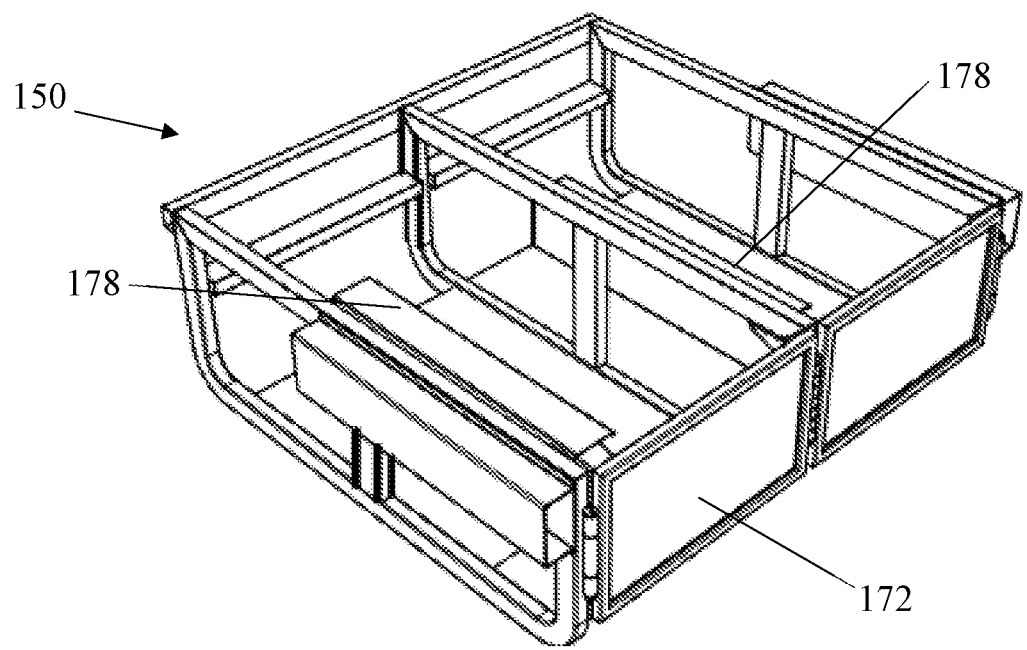
FIG. 3A is an isometric view of a retention corral with swinging doors in a closed position, according to an embodiment of the disclosure.
Figure 3B:
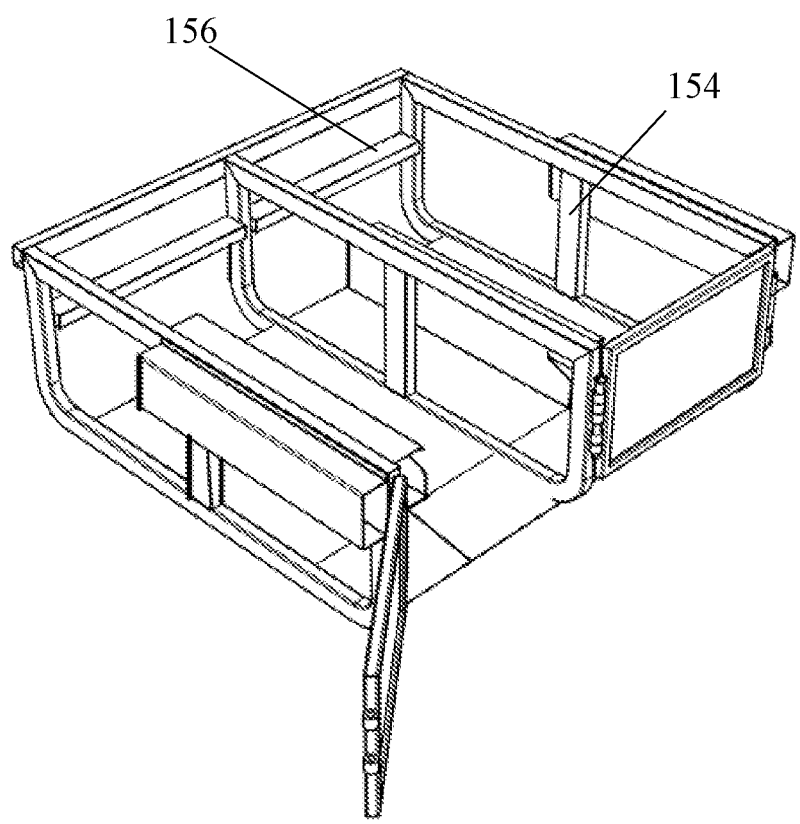
FIG. 3B is an isometric view of a retention corral with a first swinging door in an open position, according to an embodiment of the disclosure.

Referring now to FIGS. 3A and 3B, first swinging door 172 of retention corral 150 can operate in the closed position and the open position, respectively.

Many of the following embodiments have many similarities to refuse cart system 100 and for simplicity the description of common components is not repeated in the following, and like numerals may designate like parts throughout that are corresponding or analogous.

Figure 4A:
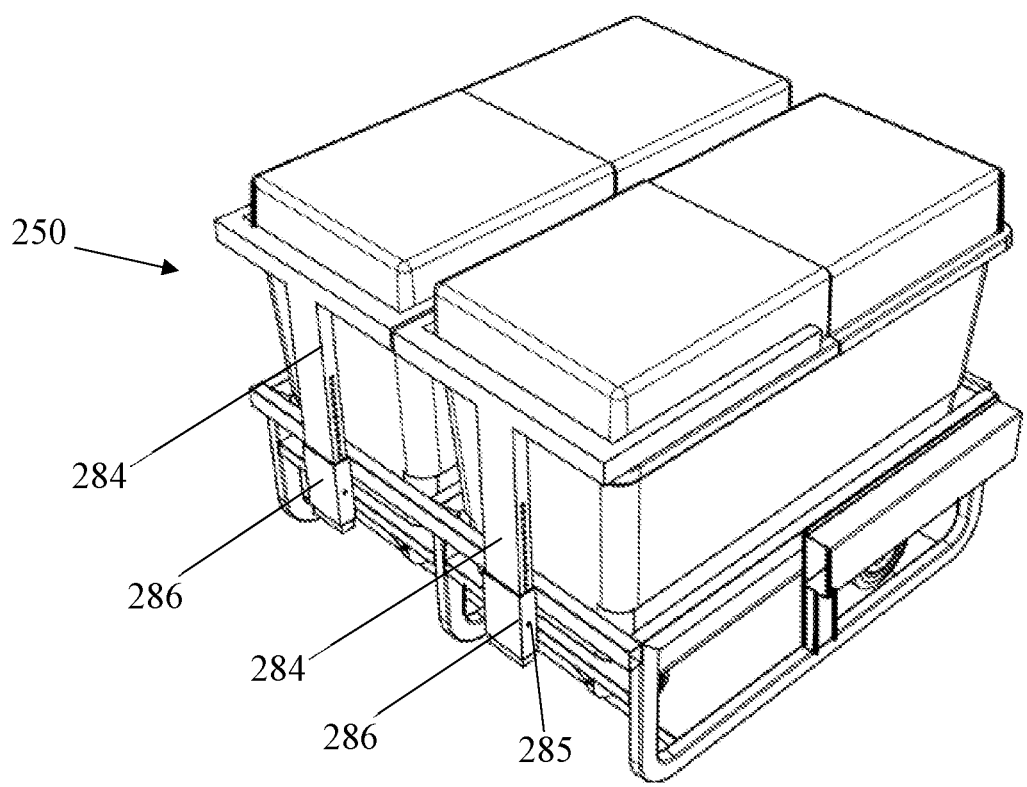
FIG. 4A is an isometric view of a refuse cart retention system, according to an embodiment of the disclosure.
Figure 4B:
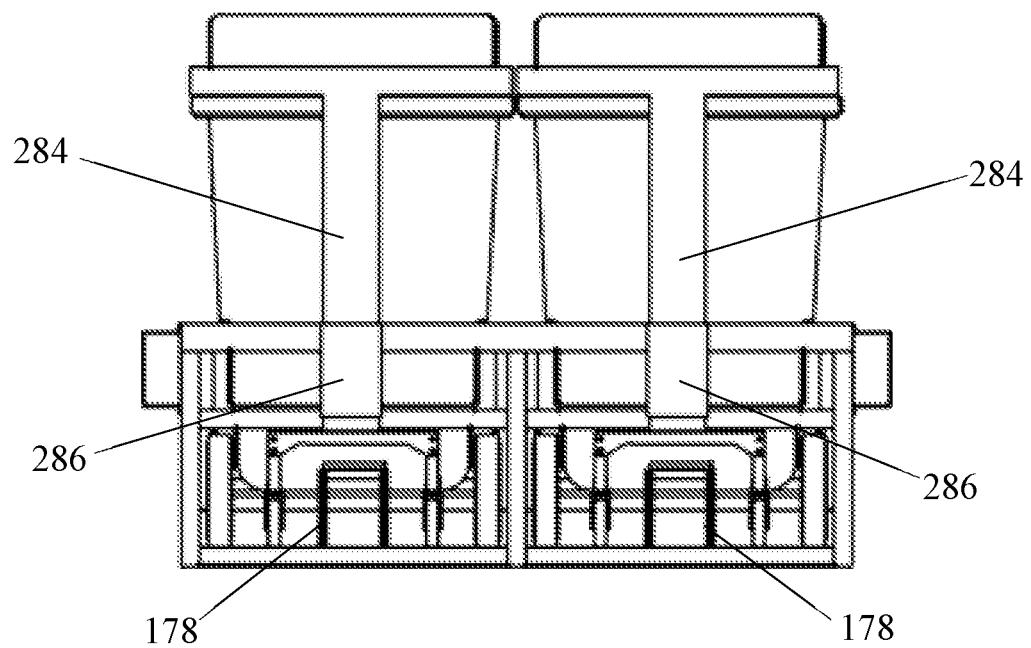
FIG. 4B is a back view of the refuse cart retention system shown in FIG. 4A.

Referring now to FIGS. 4A and 4B, retention corral 250 can include yoke 284 which can be configured to retain large refuse cart 110 by tightly grasping the fixed rear half portion of large lid 122 while still allowing the front half portion of large lid 122 to be lifted upwards during waste dumping. A top portion of yoke 284 typically has a width substantially equivalent to a width of large refuse cart 110 thus creating an operable coupling. Yoke 284 can include a plurality of apertures located along a side surface that extend through a width of yoke 284. A bottom portion of yoke 284 can be inserted into a yoke pocket 286 having a rectangular aperture extending along a length of yoke pocket 286 and an inner perimeter slightly larger than an outer perimeter of yoke 284. Yoke pocket 286 can be fixedly couplable to a point on support connector 158 located between side fixture 162 and middle fixture 164. Yoke pocket 286 can include an aperture located along a side surface in the same plane as the side surface of yoke 284. The aperture of yoke pocket 286 can extend through a width of yoke pocket 286 and can be made concentric with any one of the plurality of apertures located on yoke 284.

The height at which yoke 284 grips large lid 122 can be adjustable via yoke pocket 286 and a yoke pin 285 which can be inserted through the aperture of yoke pocket 186 and any one of the plurality of apertures of yoke 284. Yoke 284, yoke pocket 286, and yoke pin 285 are generally made from the same materials as retention corral 250.

Figure 5A:
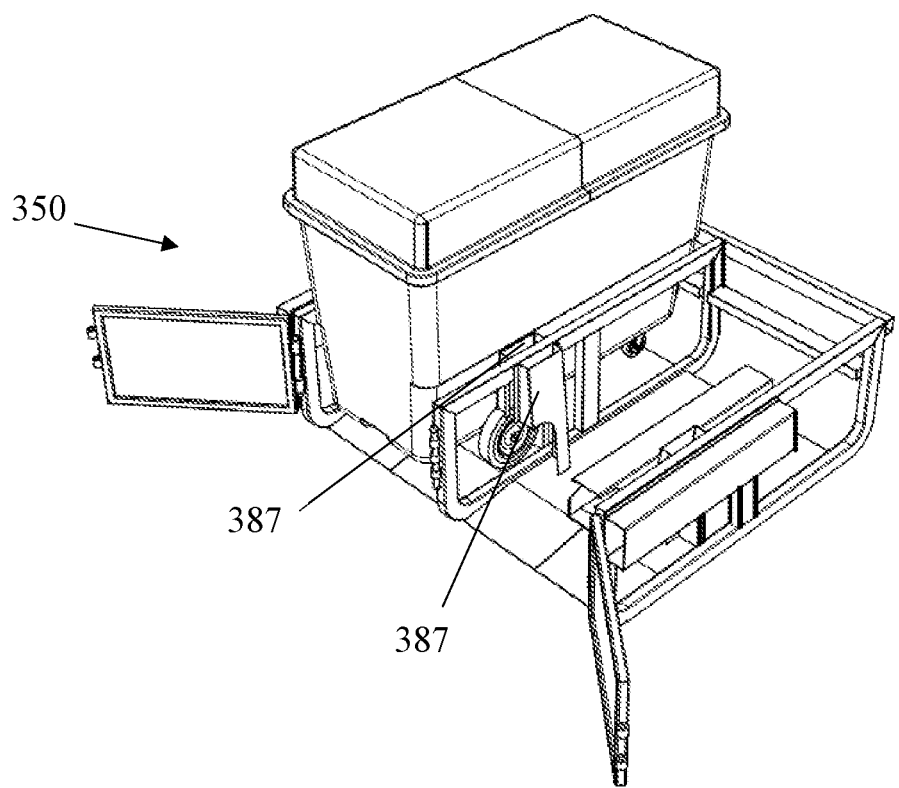
FIG. 5A is an isometric view of a refuse cart retention system, according to an embodiment of the disclosure.
Figure 5B:
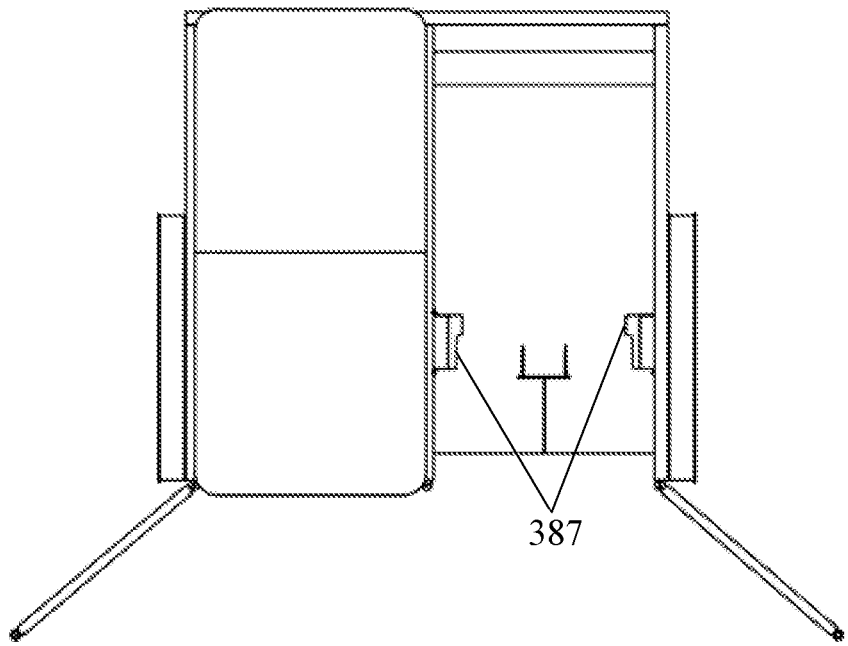
FIG. 5B is a top view of the refuse cart retention system shown in FIG. 5A.

Referring now to FIGS. 5A and 5B, retention corral 350 can include a plurality of wheel pockets 387 each having a top portion fixedly couplable to either an inner surface of side fixture 162 facing large refuse cart 110 or to a surface of middle fixture 164 facing large refuse cart 110. A bottom portion of wheel pocket 387 is typically either fixedly couplable to or in direct contact with base plate 176. In the embodiment as depicted, four wheel pockets 387 in total are fixedly couplable to retention corral 350, one for each large rear wheel 126, 128 of two large refuse carts 110.

Each wheel pocket 387 can be positioned at a point corresponding to a location of large rear wheels 126, 128 when large refuse cart 110 is in the retained position. Wheel pocket 387 can include an open portion extending from base plate 176 to a height equivalent to a diameter of large rear wheels 126, 128. Wheel pocket 387 can be configured to receive a single large rear wheel 126, 128 such that the large rear wheel 126, 128 becomes operably couplable to wheel pocket 387 and is thus retained by retention corral 350. When an external force acts upon large refuse cart 110, large rear wheels 126, 128 can be dislodged from wheel pockets 387 such that large refuse cart 110 alternates from the retained position to the transition position.

Figure 6A:
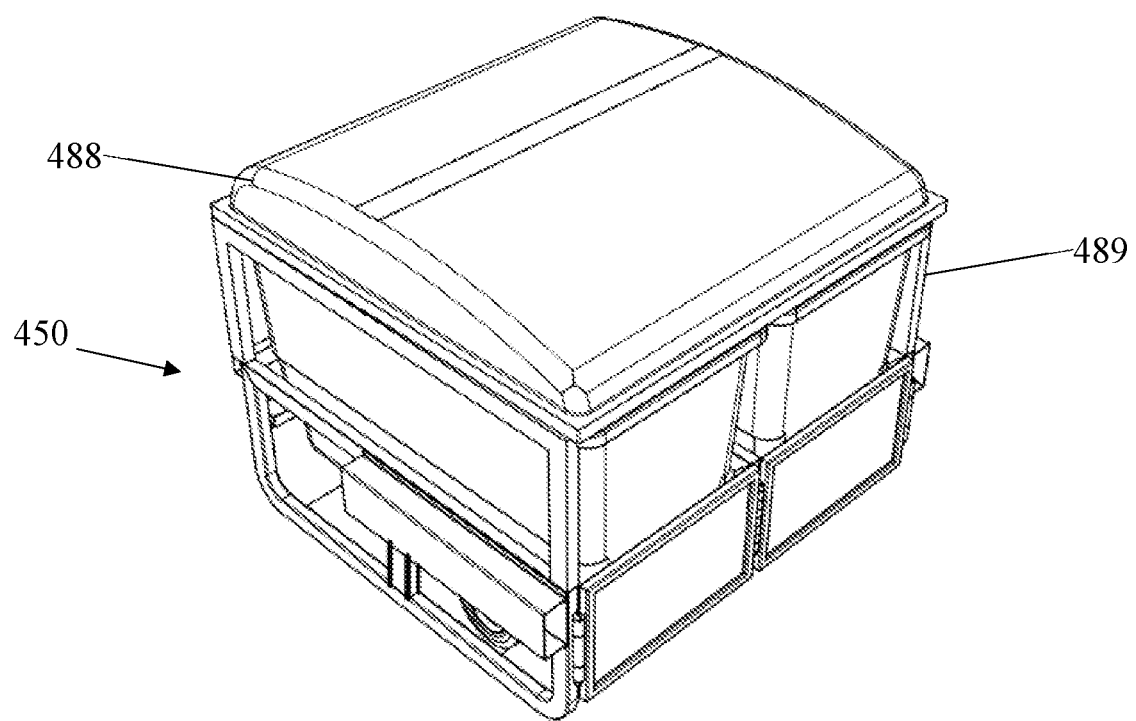
FIG. 6A is an isometric view of a refuse cart retention system with an integrated lid in a closed position, according to an embodiment of the disclosure.
Figure 6B:
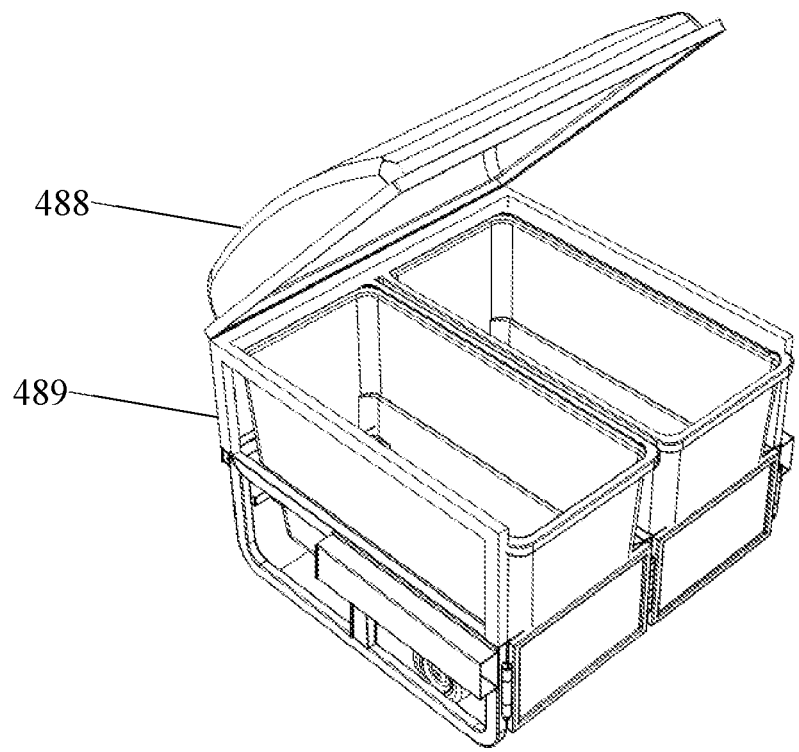
FIG. 6B is another isometric view of the refuse cart retention system shown in FIG. 6A with the integrated lid in an open position.

Referring now to FIGS. 6A and 6B, retention corral 450 can include integrated lid 488 in place of each large refuse cart 110 having their own large lid 122. A back portion of integrated lid 488 can be fixedly couplable to a back portion of a support fixture 489 such that a front portion of integrated lid 488 can be lifted upwards by an external force which exposes the inside of each container 114 of large refuse carts 110.

Integrated lid 488 can be designed with a sloped surface to make opening large refuse cart 110 easier and can comprise an area sufficient to completely cover at least two refuse carts 110 as well as the open space located between the individual refuse carts 110. Support fixture 489 generally includes a plurality of rectangular beams connected to form a support structure for integrated lid 188. Support fixture 489 can be fixedly couplable to each side fixture 162 and support connector 158, thus connecting support fixture 489 and integrated lid 488 together with the entirety of retention corral 450.

Figure 7A:
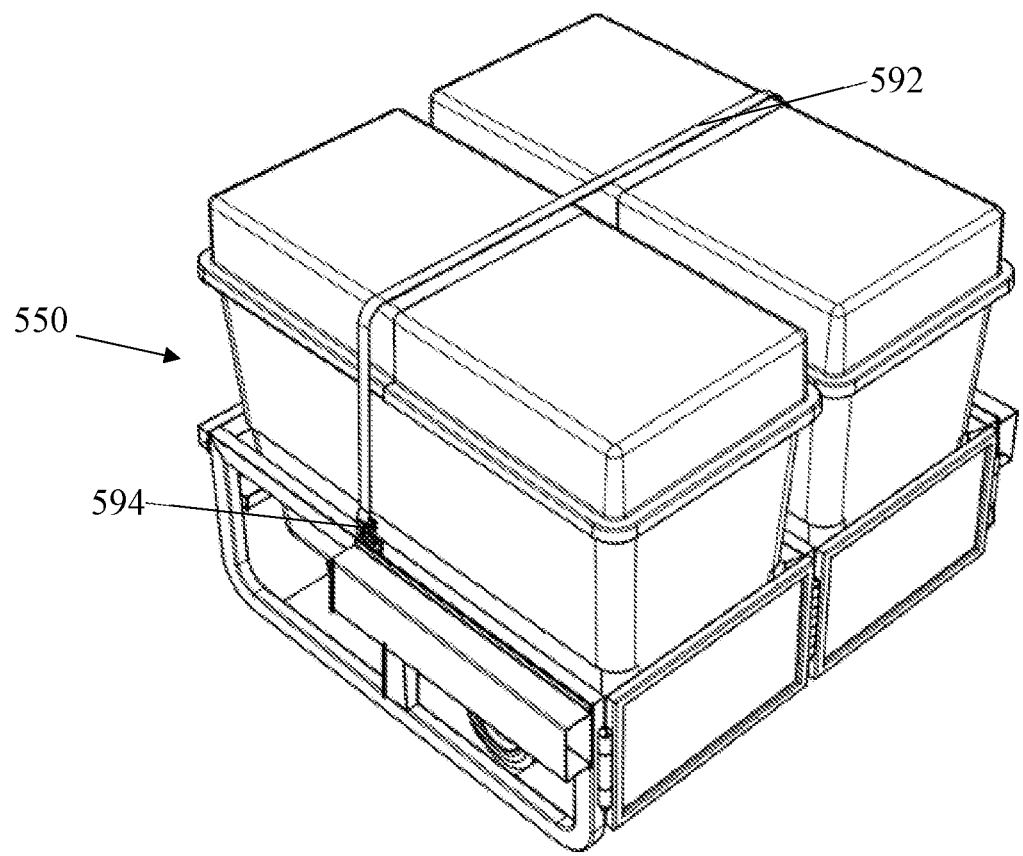
FIG. 7A is an isometric view of a refuse cart retention system, according to an embodiment of the disclosure.
Figure 7B:
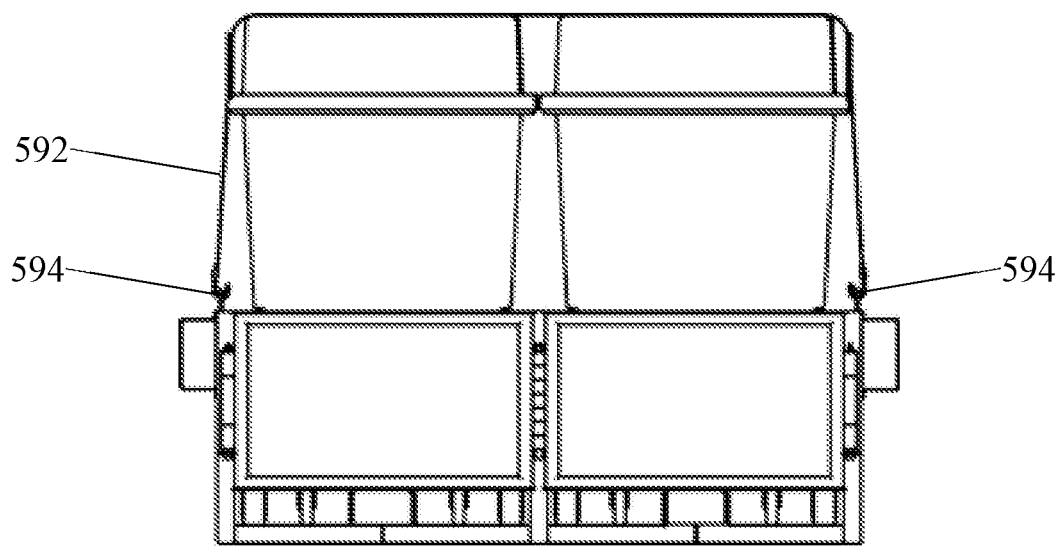
FIG. 7B is a front view of the refuse cart retention system shown in FIG. 7A.

Referring now to FIGS. 7A and 7B, retention corral 550 can include strap 592 and strap handles 594 that work to retain large refuse carts 110. A single strap handle 594 can be fixedly couplable to the horizontal midpoint of each side fixture 162. Strap 592 can be operably couplable to each strap handle 594 such that strap 592 connects each side fixture 162 together. Strap 592 can be at a length such that it becomes tightly strung against large refuse carts 110 thus retaining large refuse carts 110 in retention corral 550. When tightly strung against large refuse carts 110, strap 592 keeps the rear half portion of large lids 122 fixedly closed while the front half portion of large lids 122 can be lifted upwards by an external force. Strap 592 can be uncoupled from strap handles 594 by an external force such as those previously described. In an embodiment, strap 592 may consist of an adjustable winch strap which can be affixed directly at both ends to side fixtures 162 instead of strap handles 594. Persons skilled in the art will recognize that strap 592 and strap handles 594 are common accessories readily available and functionally easy to understand and operate.

Figure 8A:
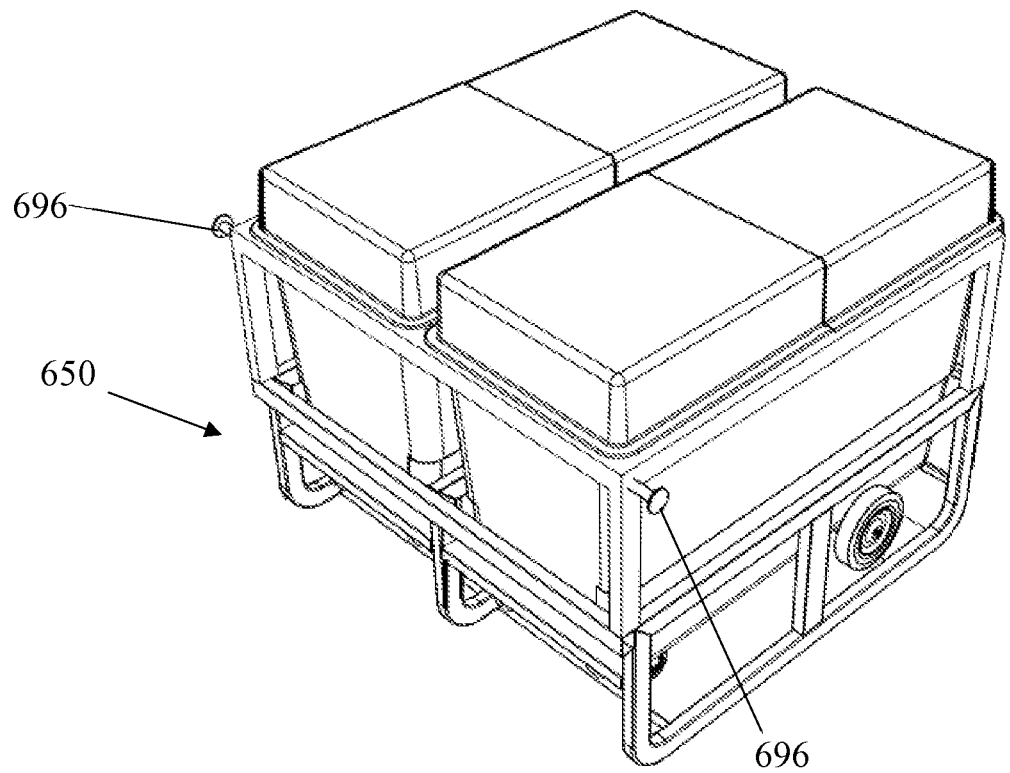
FIG. 8A is an isometric view of a refuse cart retention system, according to an embodiment of the disclosure.
Figure 8B:
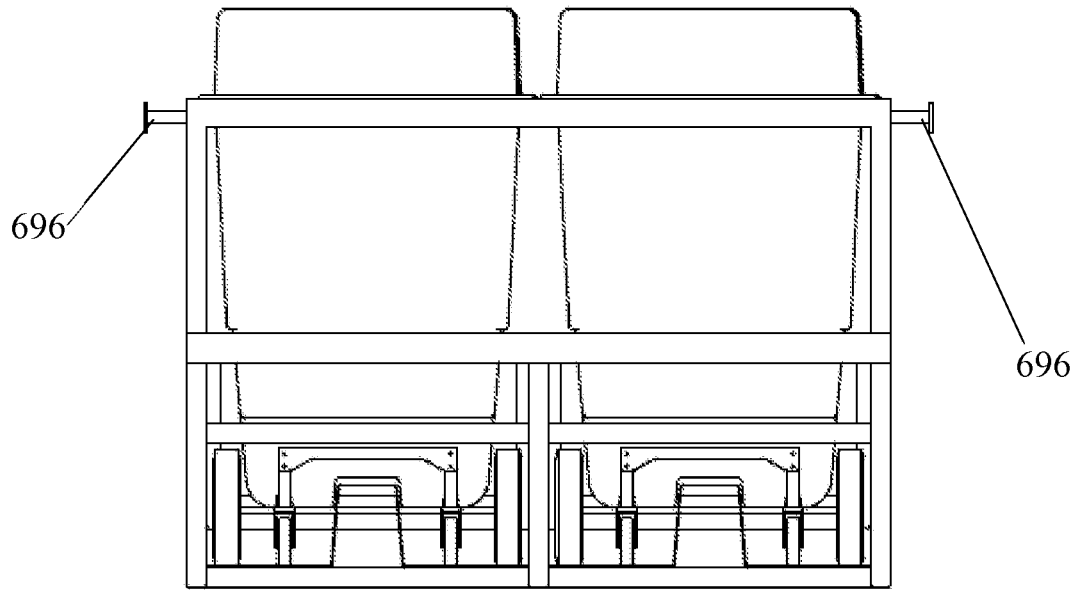
FIG. 8B is a back view of the refuse cart retention system shown in FIG. 8A.

Referring now to FIGS. 8A and 8B, retention corral 650 is configured for use with a rear load garbage truck and can include a single lug 696 fixedly couplable to a rear, outer-facing surface of support fixture 489 on each end having a side fixture 162. Additionally, fork pockets 152 are optionally included and as such are not depicted in FIGS. 8A and 8B. Lug 696 can include a first cylindrical portion extending outward in a direction parallel to a length of support connector 158 followed by a second cylindrical portion having a larger diameter and shorter length than the first cylindrical portion. Persons skilled in the art will recognize that lug 696 is a common accessory readily available and functionally easy to understand and operate. Lugs 196 can allow retention corral 650 to be used with a rear load dump truck in place of a front dump truck.

Figure 9A:
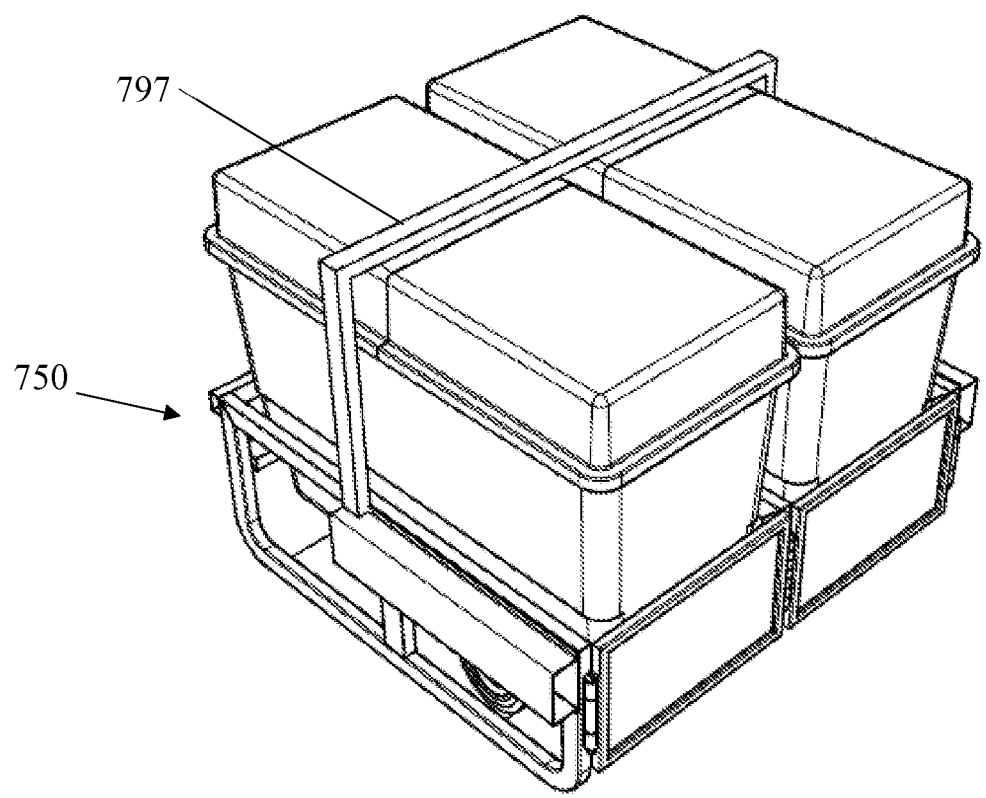
FIG. 9A is an isometric view of a refuse cart retention system, according to an embodiment of the disclosure.
Figure 9B:
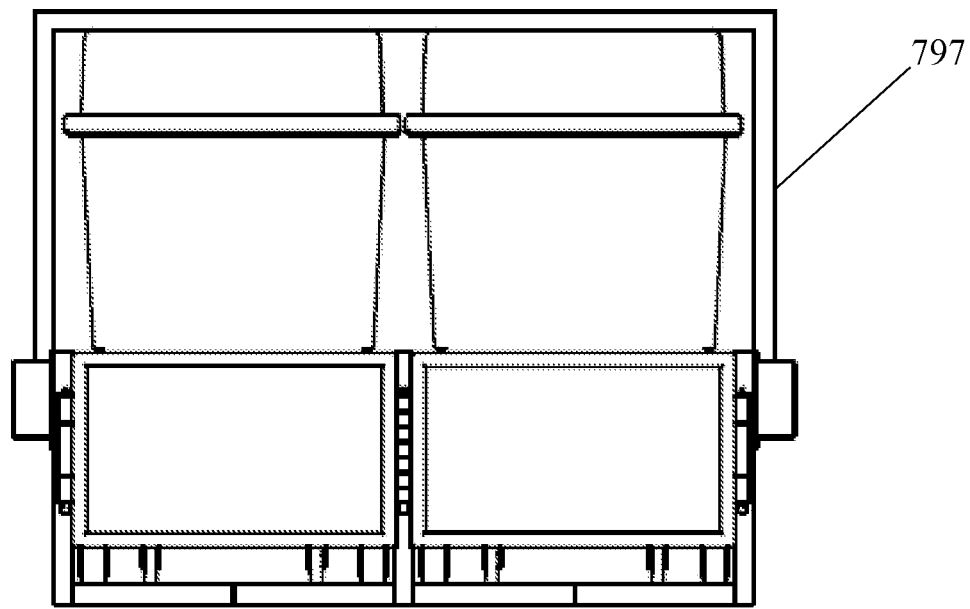
FIG. 9B is a front view of the refuse cart retention system shown in FIG. 9A.

Referring now to FIGS. 9A and 9B, retention corral 750 can include an upper retaining bar 797 which works to retain large refuse carts 110. Upper retaining bar 797 generally includes a plurality of rectangular beams connected to form a retaining structure for large refuse carts 110. Upper retaining bar 797 can be fixedly couplable to an end portion of a fork pocket 152 attached to each side fixture 162 such that upper retaining bar 797 is placed in tight contact with the rear half portion of large lids 122. This tight contact keeps the rear half portion fixedly closed while the front half portion of large lids 122 can be lifted upwards by an external force.

Figure 10A:
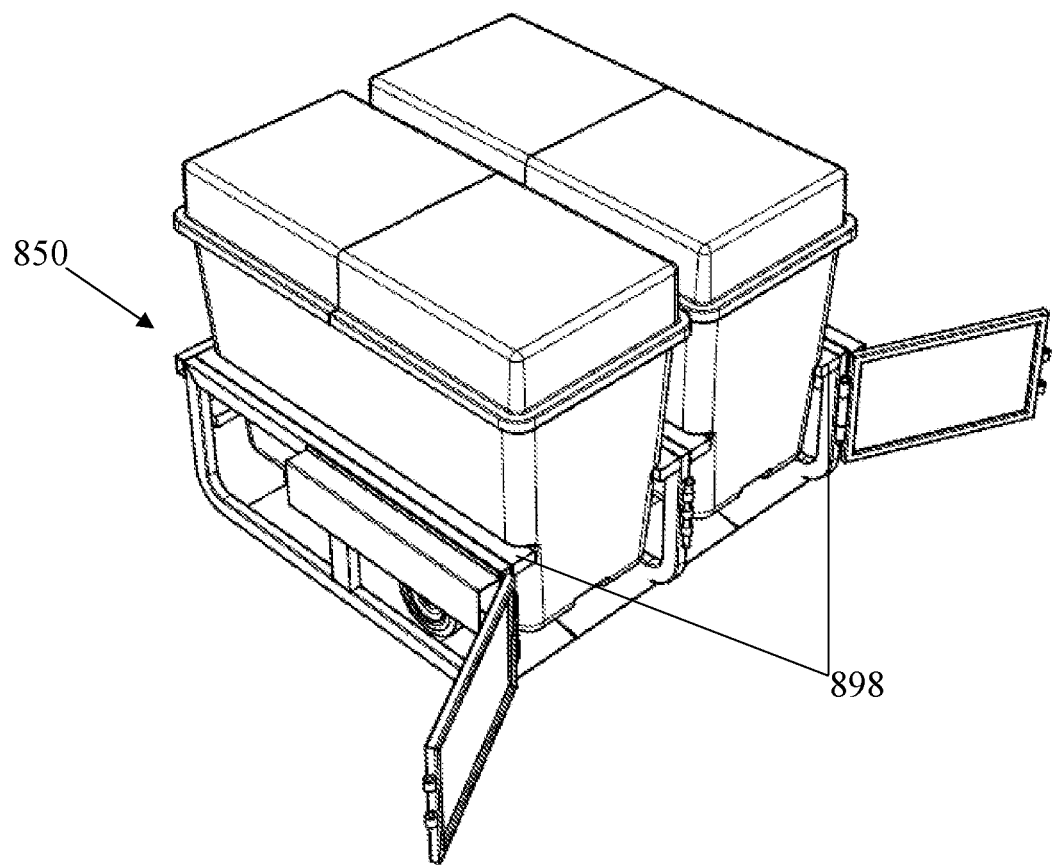
FIG. 10A is an isometric view of a refuse cart retention system, according to an embodiment of the disclosure.
Figure 10B:
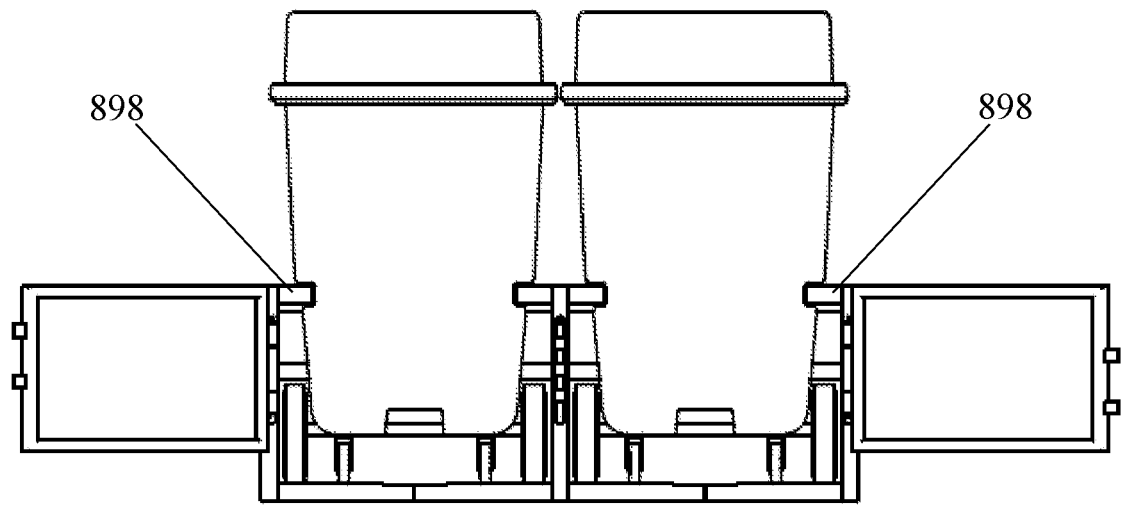
FIG. 10B is a front view of the refuse cart retention system shown in FIG. 10A.

Referring now to FIGS. 10A and 10B, retention corral 850 can include a frame protrusion 898 fixedly couplable to either an inner-facing surface of each side fixture 162 or to each outward-facing surface of middle fixture 164. Frame protrusion 898 generally has a length equivalent to that of side fixture 162 and is typically in direct contact at one end with an inner-facing surface of support connector 158. Frame protrusion 898 generally has a substantially rectangular geometry with a cutout that corresponds to a geometry of an outer surface of container 114. As a result, when entering retention corral 850, large refuse cart 110 can be placed in tight contact with frame protrusions 898 thus retaining large refuse cart 110 in place.

Figure 11A:
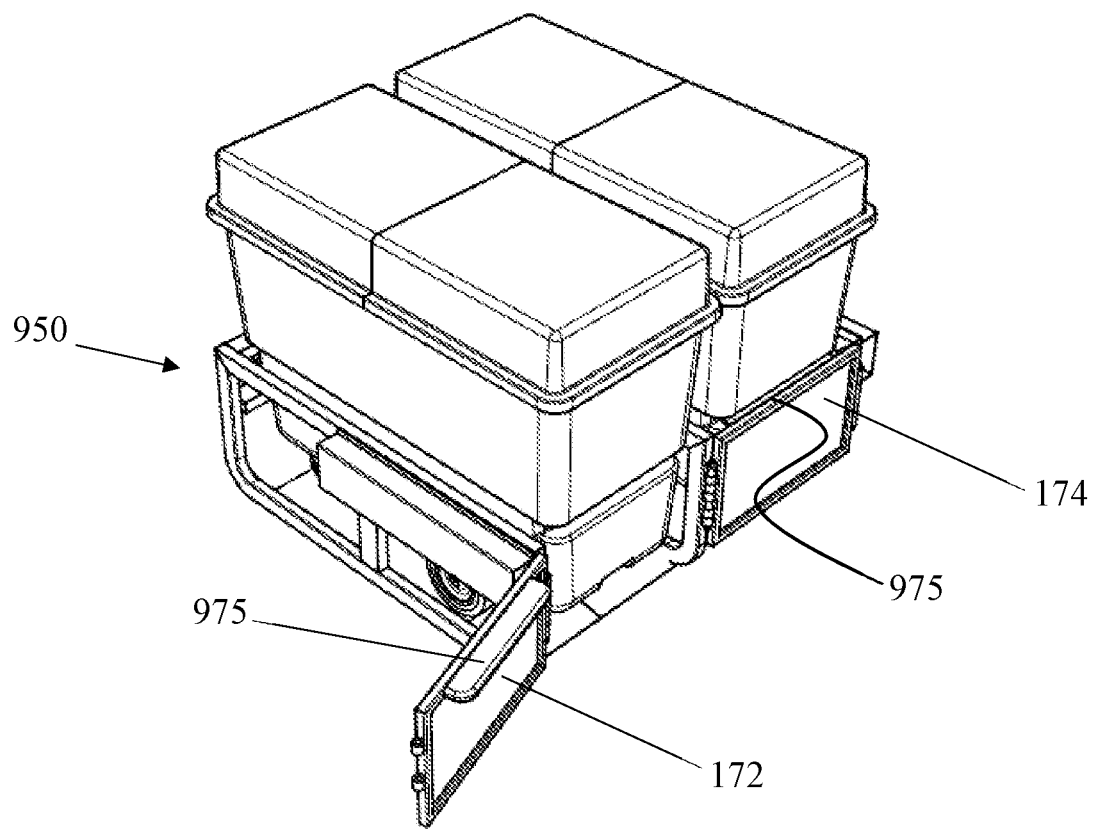
FIG. 11A is an isometric view of a refuse cart retention system according to an embodiment of the disclosure.
Figure 11B:
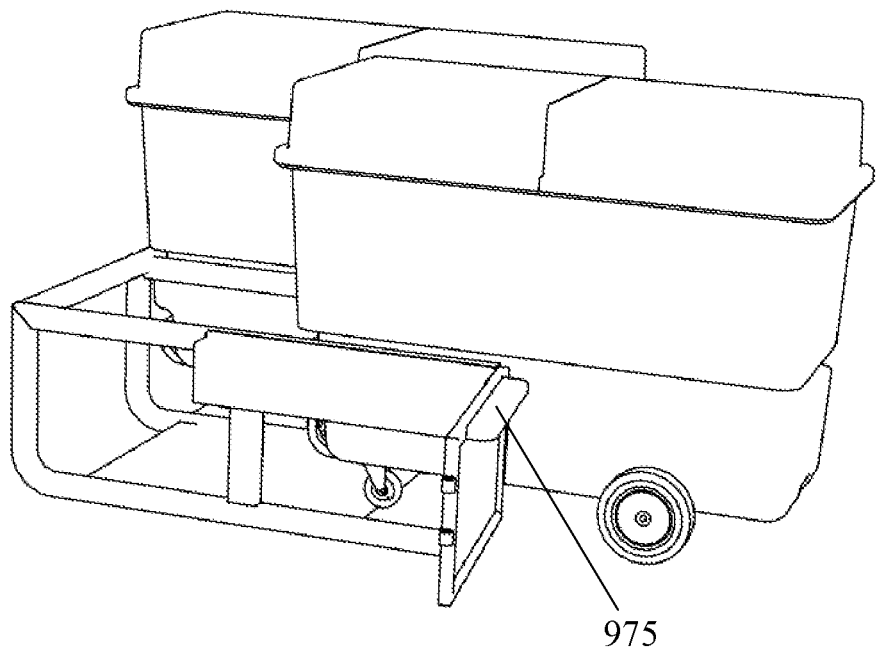
FIG. 11B is a side view of the refuse cart retention system shown in FIG. 11A.

Referring now to FIGS. 11A and 11B, retention corral 950 can include a door protrusion 975 fixedly couplable to each of first swinging door 172 and second swinging door 174. Door protrusion 975 generally has a substantially rectangular geometry with rounded edges that corresponds to a geometry of a cutout located on a front surface of container 114. When doors 172, 174 are closed, door protrusion 975 can be placed in tight contact with container 114 thus retaining large refuse carts 110. When an external force opens doors 172, 174, large refuse carts are typically no longer retained in retention corral 950 unless a retention mechanism from a previous embodiment is being used concurrently.

Figure 12A:
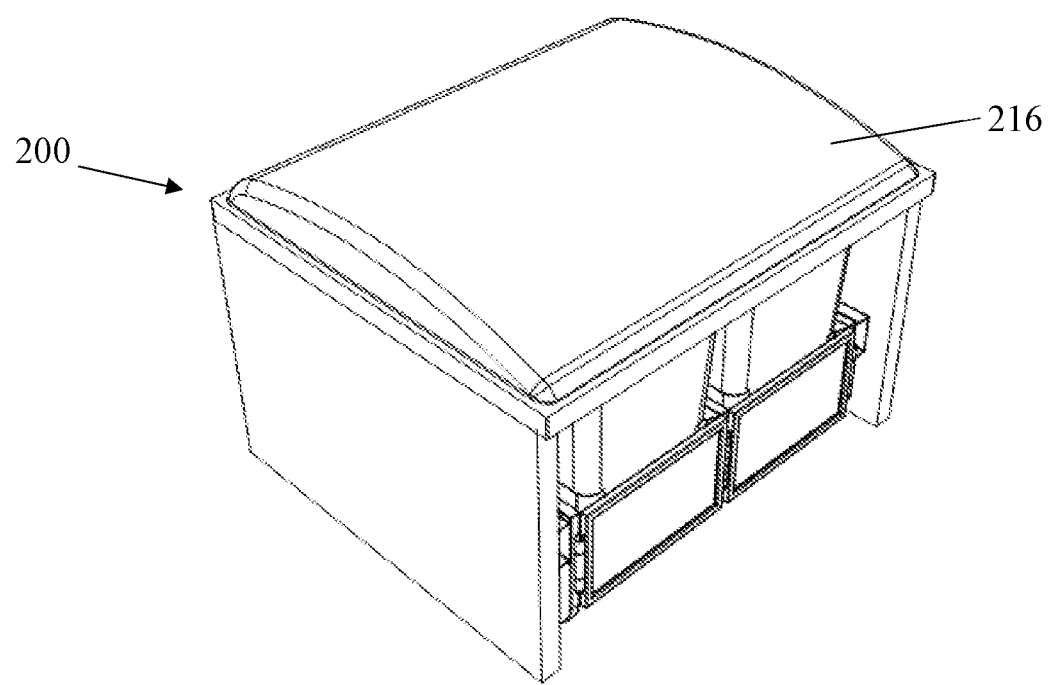
FIG. 12A is an isometric view of a refuse cart retention system with an enclosure lid in a closed position, according to an embodiment of the disclosure.
Figure 12B:
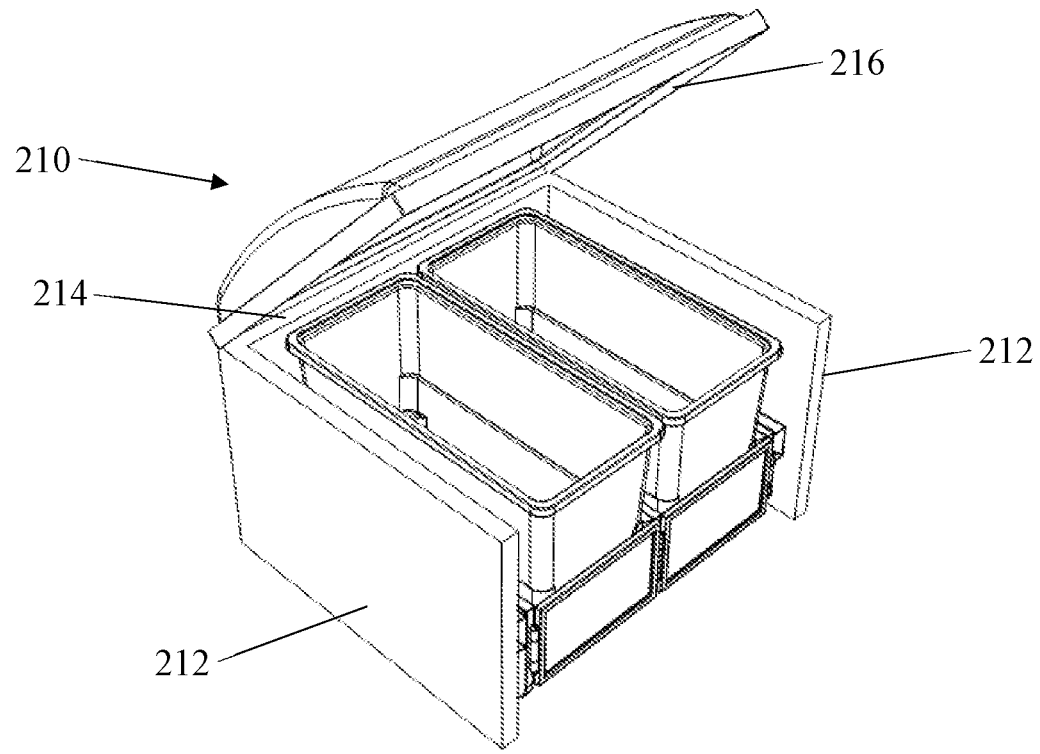
FIG. 12B is another isometric view of the refuse cart retention system shown in FIG. 12A with the enclosure lid in an open position.
Figure 13A:
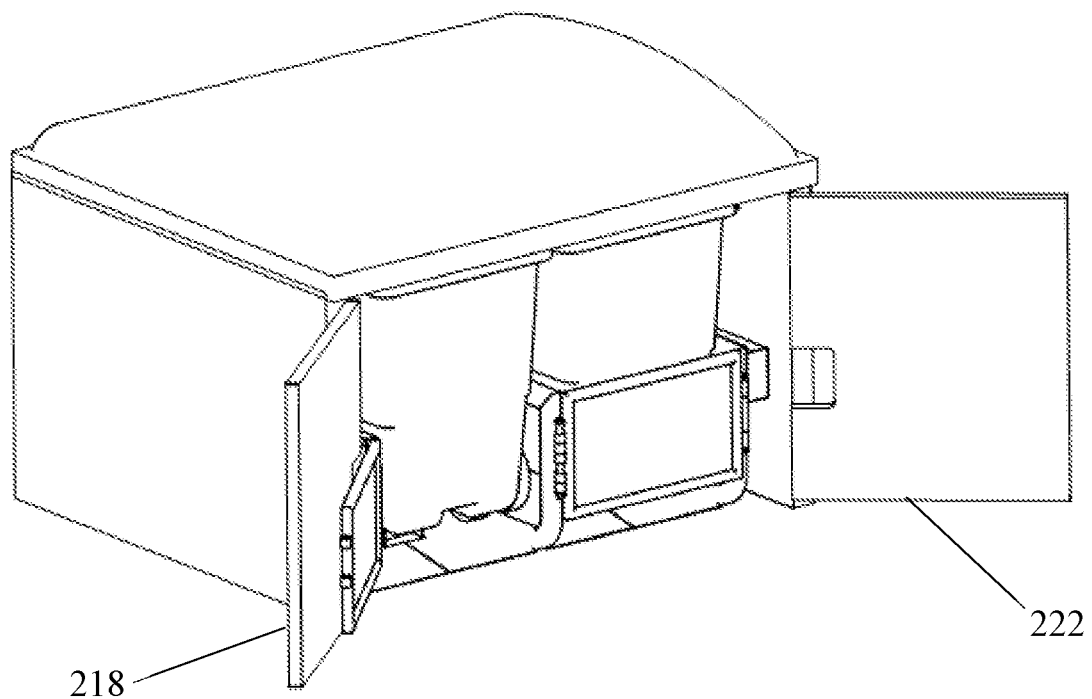
FIG. 13A is an isometric view of a refuse cart retention system with enclosure doors in an open position, according to an embodiment of the disclosure.
Figure 13B:
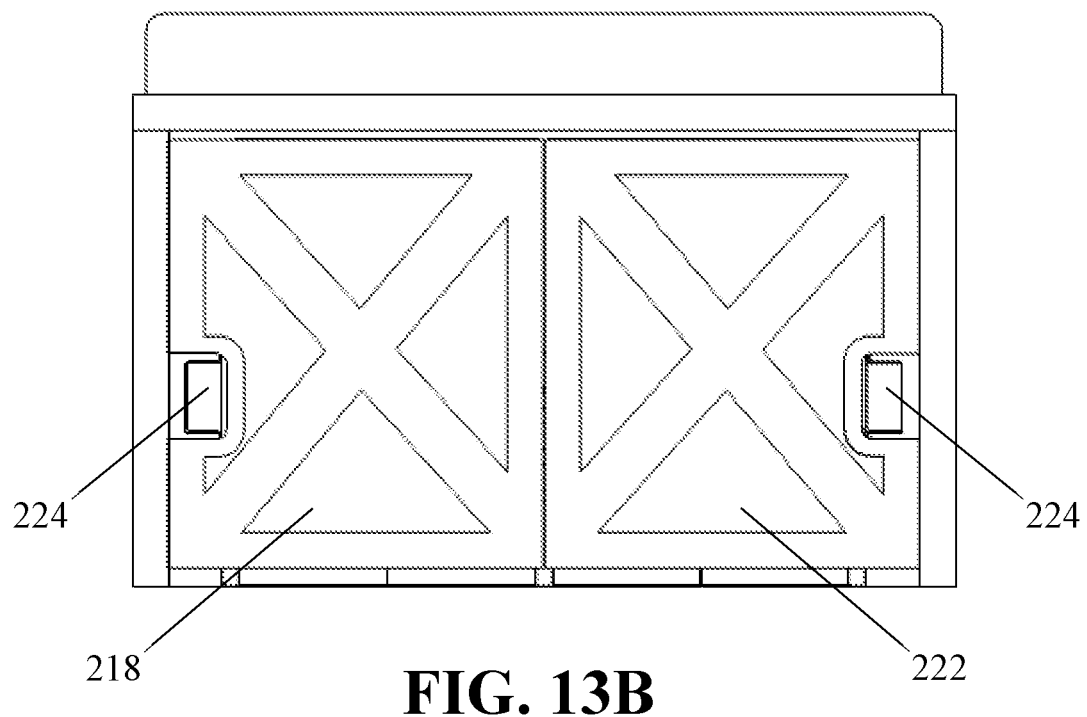
FIG. 13B is a front view of the refuse cart retention system shown in FIG. 13A with enclosure doors in a closed position.
Figure 13C:
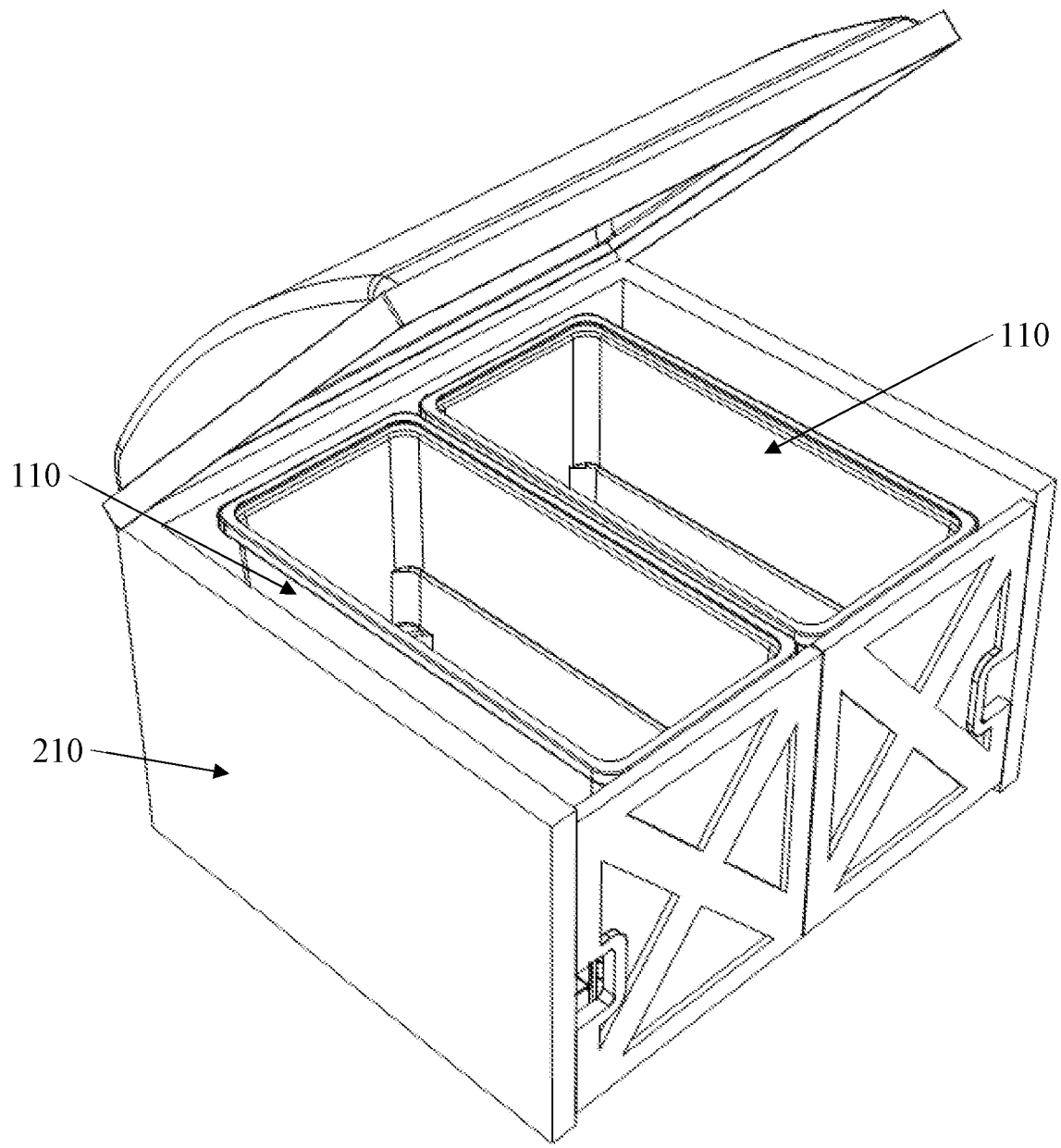
FIG. 13C is another isometric view of the refuse cart retention system shown in FIGS. 13A and 13B.

Referring now to FIGS. 12A and 12B, refuse cart retention system 200 can include an enclosure 210 which acts as a shelter for retention corral 150 and large refuse carts 110. Enclosure 210 may be stationary where only retention corral 150 and large refuse carts 110 are lifted upwards by the vehicle, or enclosure 210 may be fixedly couplable to retention corral 150 and thus will move together with retention corral 150 and large refuse carts 110. Enclosure 210 can comprise side walls 212, back wall 214, and, optionally, enclosure lid 216, first enclosure door 218, and second enclosure door 222, as depicted in FIGS. 13A-13C. Side walls 212 and back wall 214 can be fixedly couplable to each other to form a structure enclosed on three of four sides. Enclosure lid 216 can be substantially identical to integrated lid 188 except that enclosure lid 216 has an area larger than the area of integrated lid 188 to completely cover retention corral 150 as well as the open space located between retention corral 150 and walls 212, 214.

First enclosure door 218 and second enclosure door 222 are generally each hingedly couplable to a single side fixture 162 such that enclosure doors 218, 222 can alternate between an open position and a closed position, as depicted in FIGS. 13A and 13B, respectively. Enclosure doors 218, 222 generally have a geometry that is substantially rectangular and generally include a handle mechanism 224 that allows enclosure doors 218, 222 to be opened. In an embodiment, first swinging door 172 and second swinging door 174 are not included with retention corral 150 and instead are functionally replaced by enclosure doors 218, 222 of enclosure 210. In an embodiment, refuse cart retention system 200 can comprise enclosure 210 with enclosure lid 216 included along with one or more large refuse carts 110 with large lids 122. In an embodiment, refuse cart retention system 200 can comprise enclosure 210 without enclosure lid 216 included along with one or more large refuse carts 110 with large lids 122. In an embodiment, refuse cart retention system 200 can comprise enclosure 210 with enclosure lid 216 included along with one or more large refuse carts 110 without large lids 122. Enclosure 210 can be made of various materials including metals, wood, plastic, or other suitable materials.

Figure 14A:
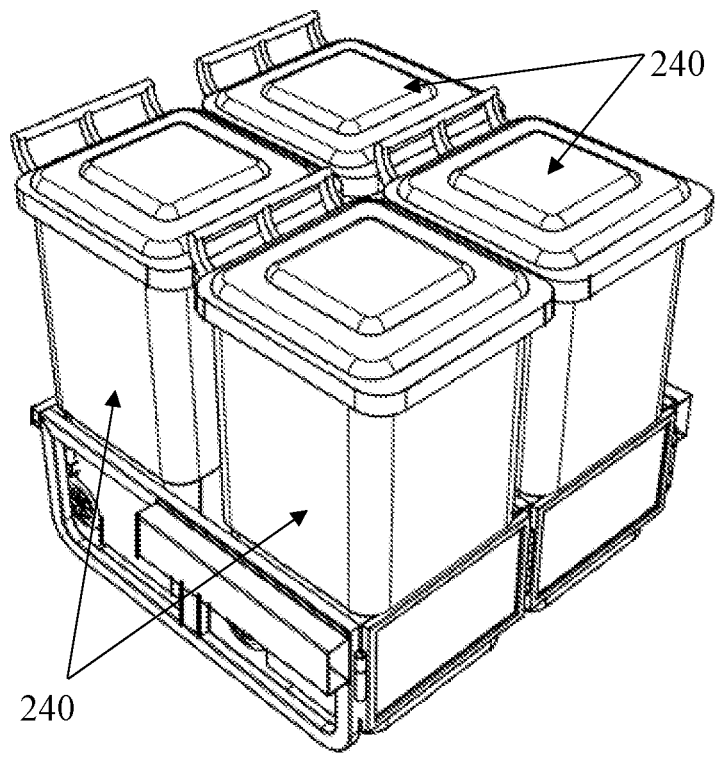
FIG. 14A is an isometric view of a refuse cart retention system, according to an embodiment of the disclosure.
Figure 14B:
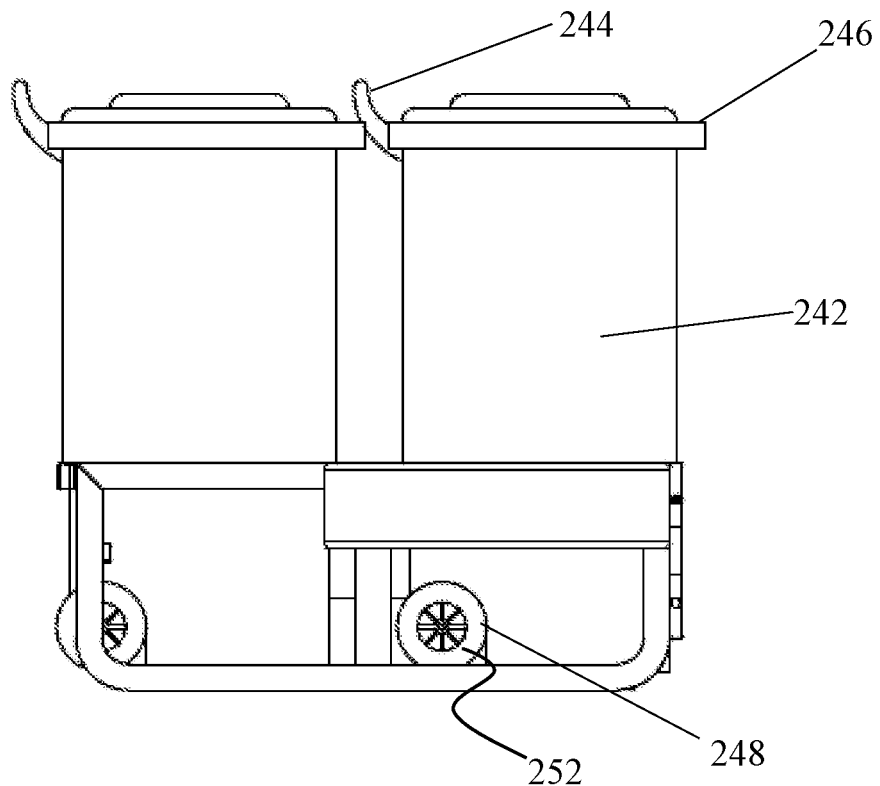
FIG. 14B is a side view of the refuse cart retention system shown in FIG. 14A.
Figure 14C:
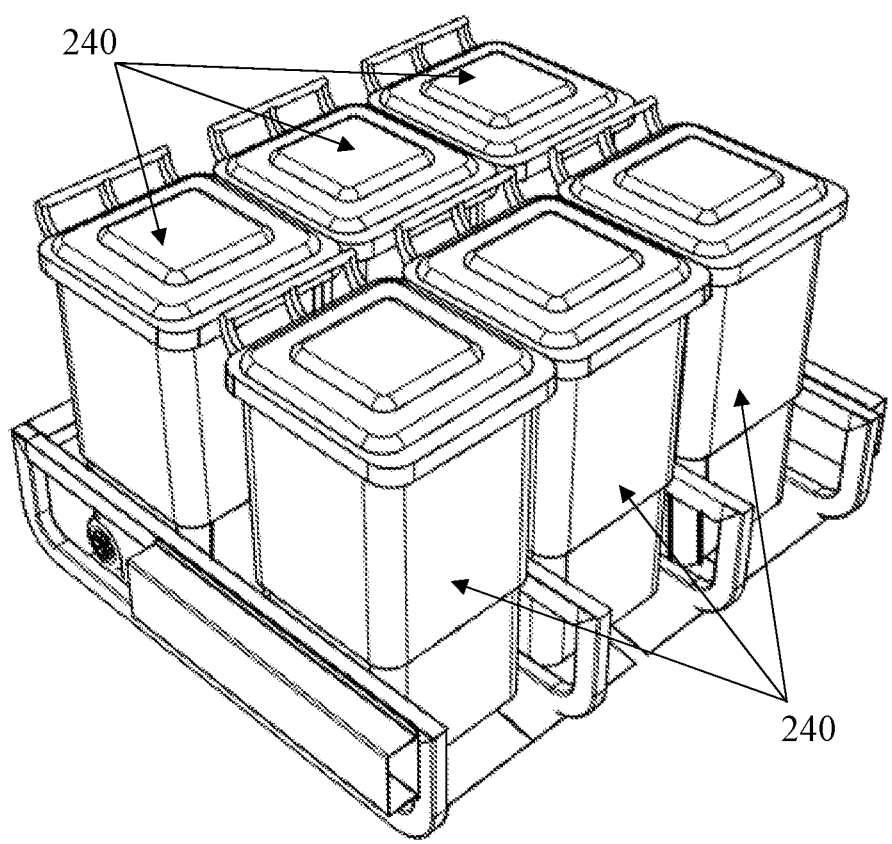
FIG. 14C is an isometric view of a configuration of the refuse cart retention system shown in FIGS. 14A and 14B.

Referring now to FIGS. 14A and 14B, retention corral 150 can receive a plurality of small refuse carts 240 each comprising a container 242, a handle 244, a small lid 246, a first small rear wheel 248, and a second small rear wheel 252. Container 242 can be designed with a geometry substantially identical to that of container 114 and thus can be retained in retention corral 150 using any of the previously discussed retention mechanisms. Handle 244 can be fixedly couplable to small lid 246 such that when an external force acts upon handle 244, all of small refuse cart 240 acts in conjunction. Persons skilled in the art will recognize the geometry of handle 244 as depicted in FIGS. 14A-14C, and that handle 244 can comprise many different geometries without loss of functionality. Likewise, people skilled in the art will recognize the geometry of small lid 246 as depicted in FIGS. 14A-14C, and that small lid 246 can comprise many different geometries without loss of functionality.

Figure 15A:
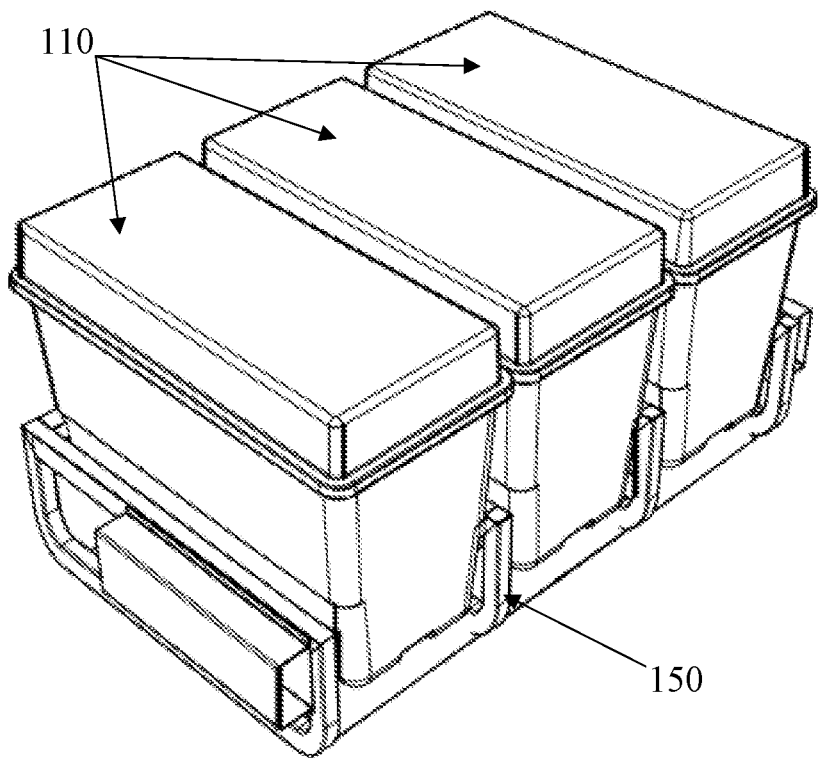
FIG. 15A is an isometric view of a refuse cart retention system, according to an embodiment of the disclosure.
Figure 15B:
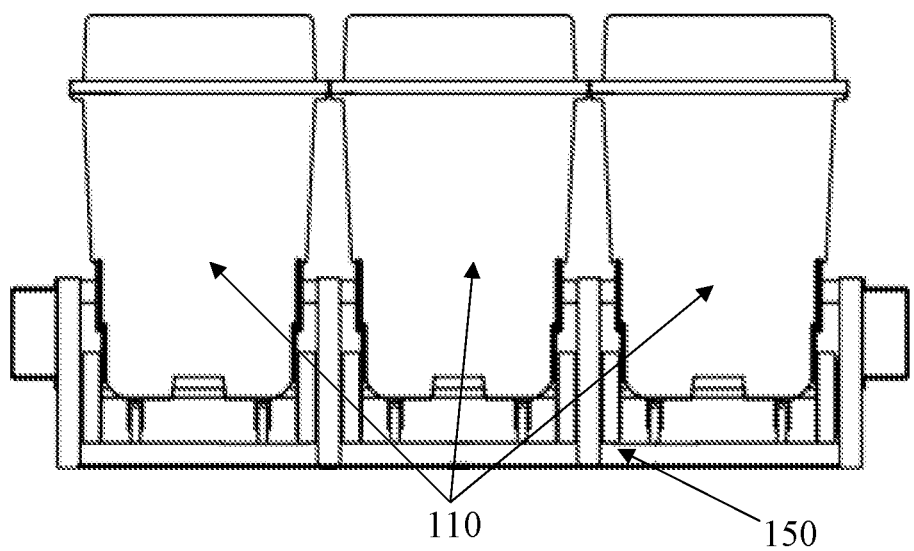
FIG. 15B is a front view of the refuse cart retention system shown in FIG. 15A.
Figure 16A:
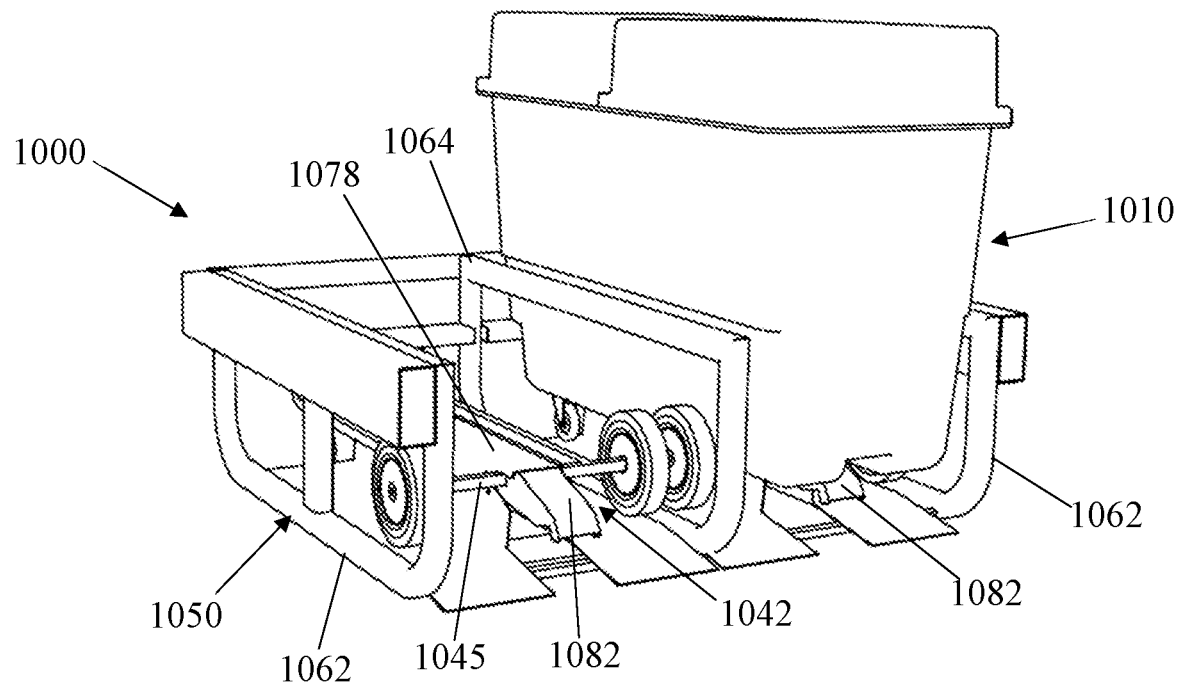
FIGS. 16A and 16B are isometric views of a refuse cart retention system, according to an embodiment of the disclosure.
Figure 16B:
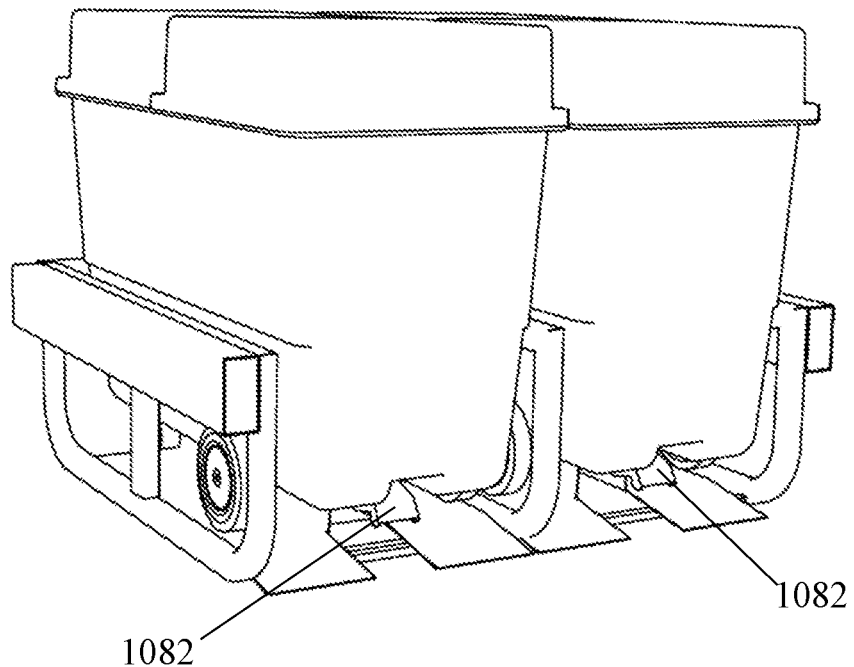
Figure 16C:
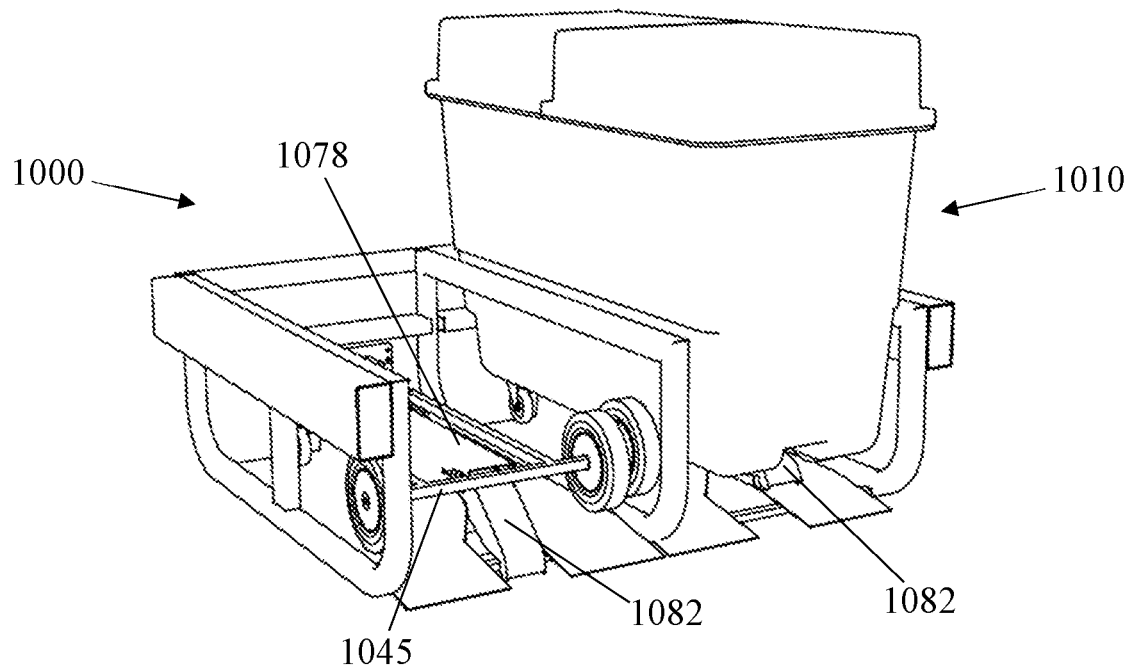
FIGS. 16C and 16D are isometric views of a refuse cart retention system, according to an embodiment of the disclosure.
Figure 16D:
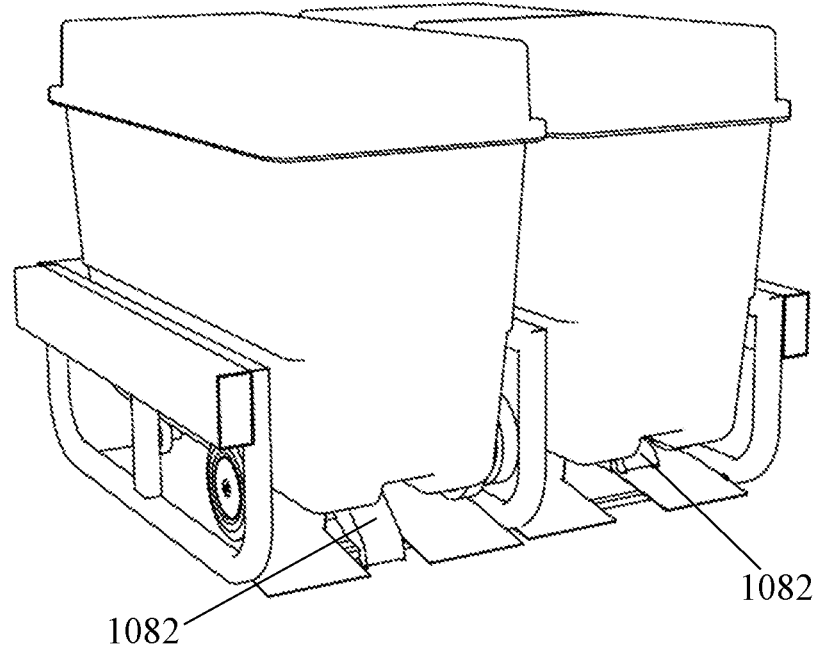

First small rear wheel 248 and second small rear wheel 252 are generally substantially identical to large rear wheels 126, 128 and thus can be retained in retention corral 150 using any mechanism in which large rear wheels 126, 128 could be retained. Referring now to FIG. 14C, retention corral 150 can be extended to include one or more extra spaces that can receive additional small refuse carts 240 or large refuse carts 110. In an embodiment, retention corral 150 can include one or more small refuse carts 240 and one or more large refuse carts 110 together, or only large refuse carts 110 as shown in FIGS. 15A and 15B. Small refuse cart 240 can be made of various materials including metals, wood, plastic, or other materials suitable for receiving and storing waste material.

Referring now to FIGS. 16A-16D, retention corral 1050 can include a locking mechanism coupled to a retention structure 1078 and configured to receive a rear segment (e.g., axle) 1045 of a frame 1042 for a large refuse cart 1010. As depicted, the locking mechanism may comprise a pedal operable by a foot of a user. Foot pedal 1082 can be generally positioned equidistant between side fixture 1062 and middle fixture 1064 such that a midpoint line of foot pedal 1082 is coincident with a midpoint line of large refuse cart 1010. Foot pedal 1082 can be movable based on an external force applied to a top surface thereof between a raised position (shown in FIGS. 16A and 16B) and a lowered position (shown in FIGS. 16C and 16D). In the raised position, foot pedal 1082 is configured to restrain rear segment 1045 against retention structure 1078 such that large refuse cart 1010 is locked in place within the retention corral 1050. When foot pedal 1082 is in the lowered position, rear segment 1045 is not restrained against retention structure 1078 which enables large refuse cart 1010 to move from a retained position to a transition position as shown, for example, in FIG. 1B and described herein. Persons skilled in the art will recognize the geometry of foot pedal 1082 as depicted in FIGS. 16A-16D, and that foot pedal 1082 can comprise many different geometries without loss of functionality.

Figure 17A:
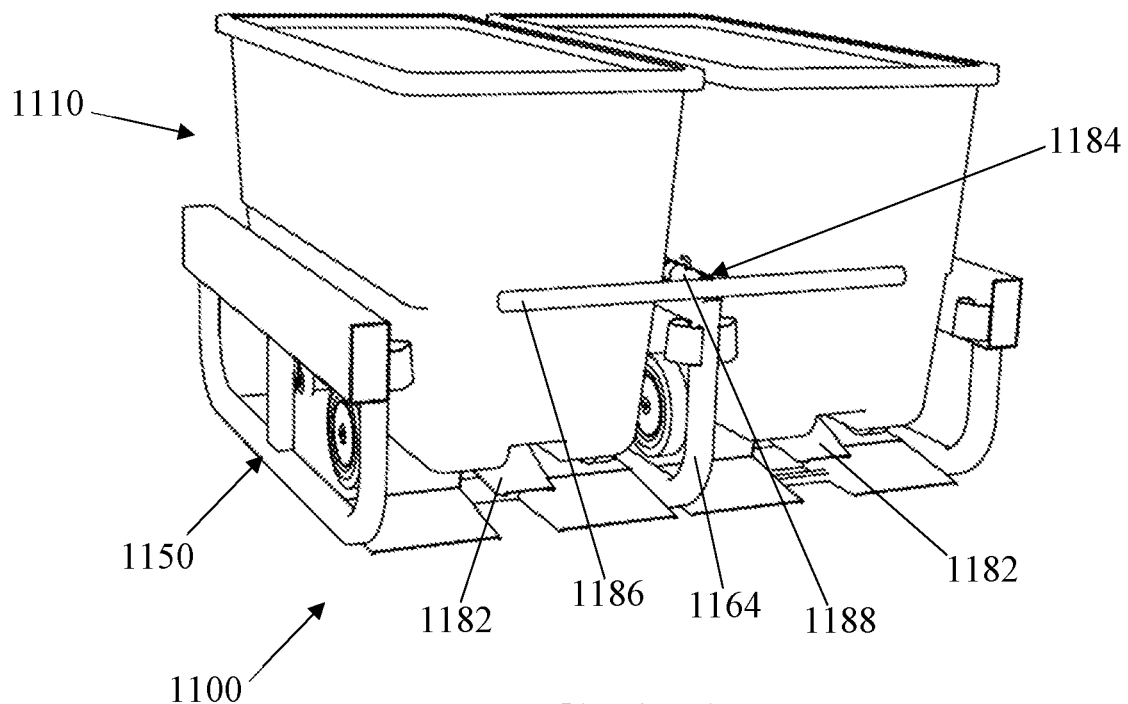
FIGS. 17A and 17B are isometric views of a refuse cart retention system, according to an embodiment of the disclosure.
Figure 17B:
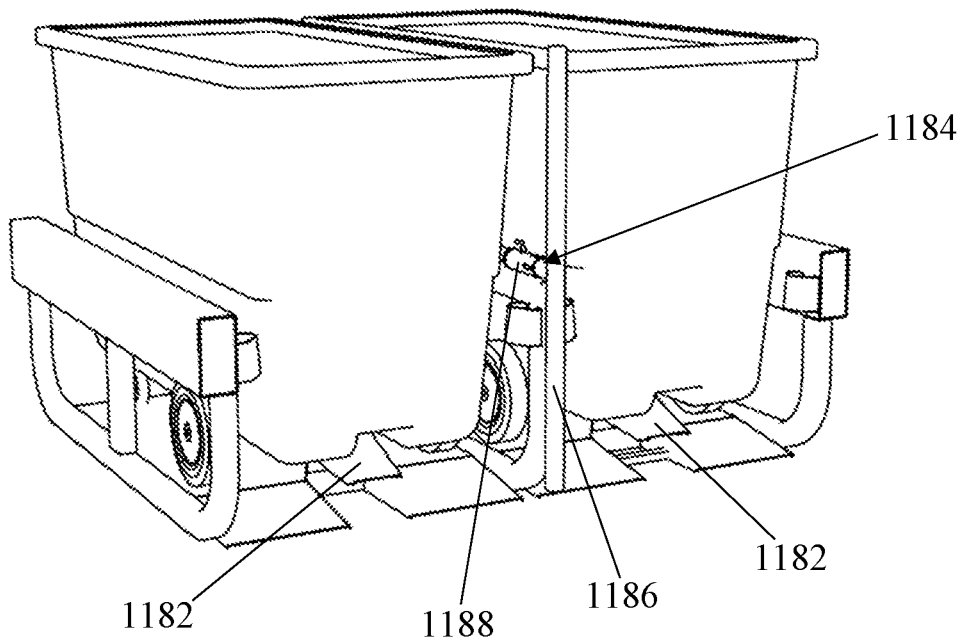

Referring now to FIGS. 17A and 17B, retention corral 1150 can include a refuse cart locking mechanism 1184 coupled to a middle fixture 1164, the refuse cart locking mechanism 1184 including a bar 1186 and a spring pin apparatus 1188 connected via matching connector channels. Refuse cart locking mechanism 1184 can be movable between a locked position (shown in FIG. 17A) and an unlocked position (shown in FIG. 17B). In the locked position, bar 1186 is positioned horizontally against large refuse carts 1110 thereby inhibiting movement of large refuse carts 1110 inside retention corral 1150. In operation, refuse cart locking mechanism 1184 can be transitioned to the unlocked position by extending bar 1186 outward from retention corral 1150, flipping bar 1186 from a horizontal orientation to a vertical orientation, and pushing bar 1186 inward toward retention corral 1150 such that the connector channel of bar 1186 coincides with the connector channel of spring pin apparatus 1188. This enables large refuse carts 1110 to move from the retained position to the transition position as shown, for example, in FIG. 1B and described herein. Persons skilled in the art will recognize the geometry of refuse cart locking mechanism 1184 as depicted in FIGS. 17A and 17B, and that refuse cart locking mechanism 1184 can comprise many different geometries without loss of functionality.

Figure 18A:
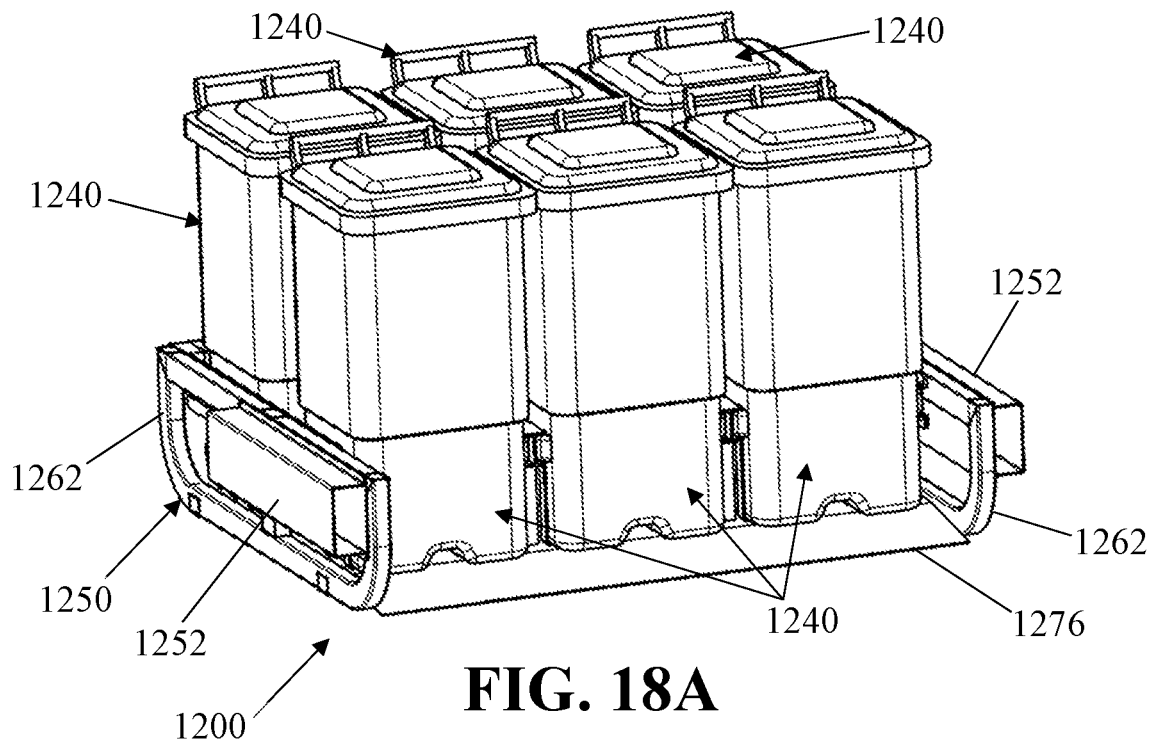
FIG. 18A is an isometric view of a refuse cart retention system, according to an embodiment of the disclosure.
Figure 18B:
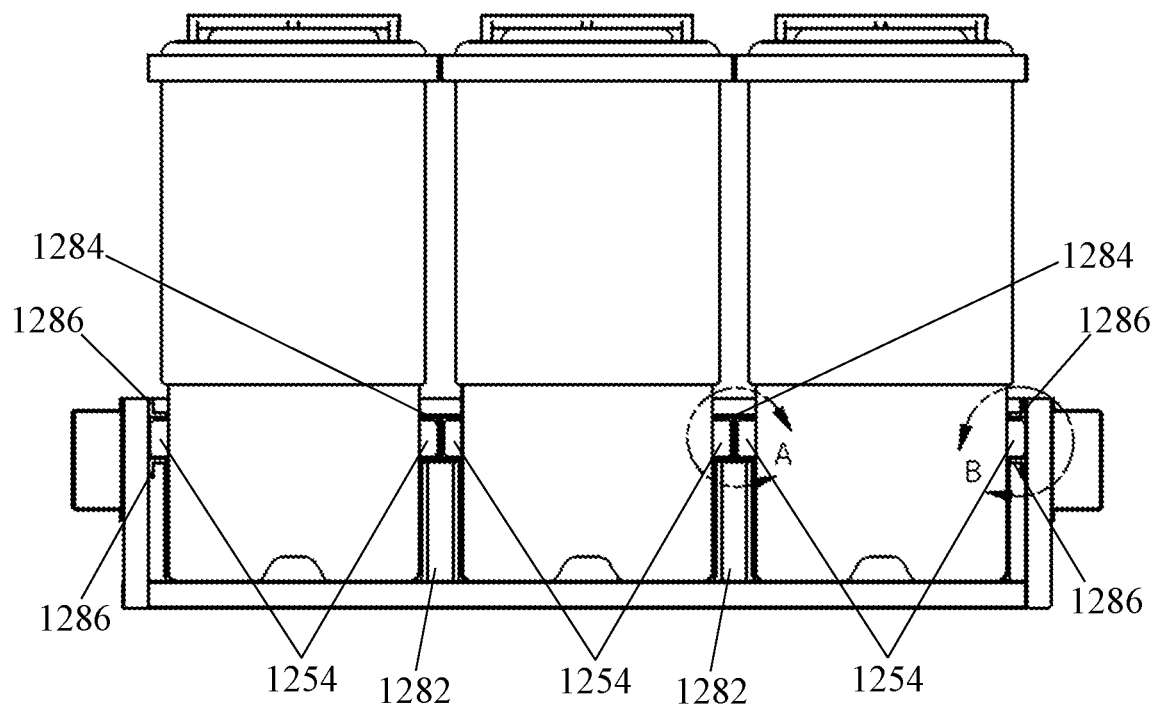
FIG. 18B is a front view of the refuse cart retention system shown in FIG. 18A.
Figure 18C:
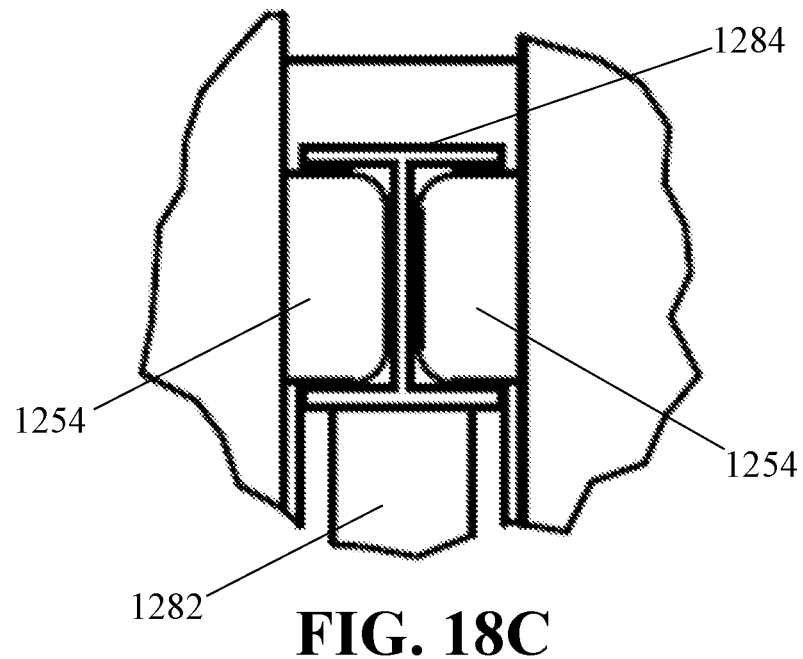
FIG. 18C is a detail view of area A of the refuse cart retention system shown in FIG. 18B.
Figure 18D:
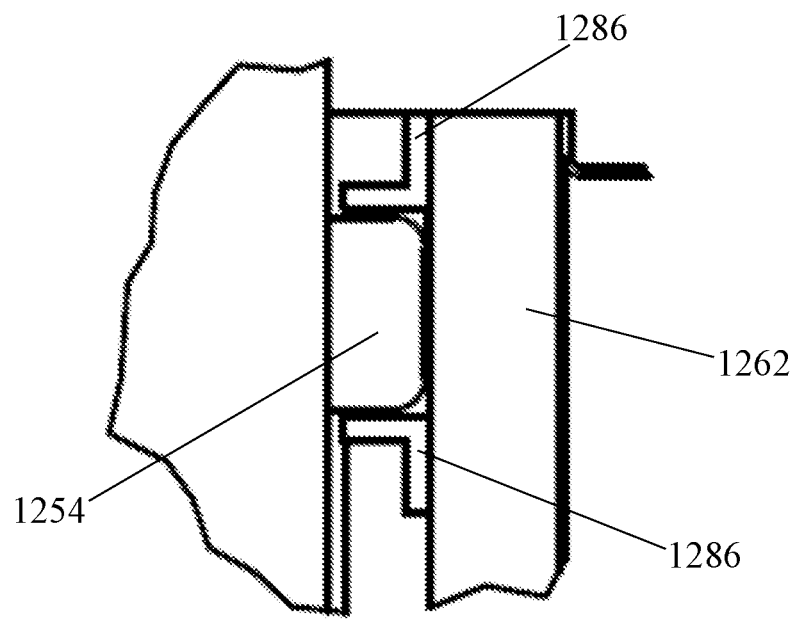
FIG. 18D is a detail view of area B of the refuse cart retention system shown in FIG. 18B.

Referring now to FIGS. 18A-18D, a refuse cart retention system 1200 may include one or more small refuse carts 1240 retained within a retention corral 1250. Small refuse carts 1240 have many similarities to small refuse carts 240 and for simplicity the description of common components is not repeated in the following, and like numerals may designate like parts throughout that are corresponding or analogous. Additionally, small refuse carts 1240 can include a pair of integrally formed horizontal protrusions 1254 positioned on opposing sides of small refuse cart 1240. Horizontal protrusions 1254 may have a cuboid geometry with rounded edges as depicted in FIGS. 18C and 18D. Small refuse carts 1240 may also define a recess located on a bottom surface thereof and positioned along a midpoint line of small refuse cart 1240.

Retention corral 1250 can include a base plate 1276, a pair of side fixtures 1262 coupled to opposing sides of the base plate 1276, one or more brackets 1286 coupled to an inward-facing surface of each side fixture 1262, a fork pocket 1252 coupled to an outward-facing surface of each side structure 1262, one or more dividers 1282 positioned between the pair of side fixtures 1262 and coupled to a top surface of the base plate 1276, and an I-bar 1284 coupled to a top surface of each of the one or more dividers 1282. Retention corral 1250 has many similarities to retention corral 150 and for simplicity the description of common components is not repeated in the following, and like numerals may designate like parts throughout that are corresponding or analogous.

I-bar 1284 is configured to receive a horizontal protrusion 1254 on each side from small refuse carts 1240 as shown in FIG. 18C. As shown in FIG. 18D, each pair of brackets 1286 are configured to receive a single horizontal protrusion 1254 of small refuse cart 1240. In receiving horizontal protrusions 1254 of small refuse carts 1240, I-bar 1284 and brackets 1286 thus act as a retention mechanism for restricting movement of small refuse carts 1240 within retention corral 1250. Dividers 1282 generally have a cuboid geometry that extends across the top surface of the base plate 1276 in a direction parallel with side fixtures 1262. Dividers 1282 serve to separate retention corral 1250 into rows of small refuse carts 1240 as shown in FIG. 18A. It should be understood that small refuse carts 1240 may be replaced with large refuse carts (not depicted) having horizontal protrusions integrally formed in a similar manner such that large refuse carts can be retained within retention corral 1250. Persons skilled in the art will recognize the geometry of divider 1282 and I-bar 1284 as depicted in FIG. 18C, and brackets 1286 as depicted in FIG. 18D, and that divider 1282, I-bar 1284, and brackets 1286 can comprise many different geometries without loss of functionality.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, embodiments and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A retention corral for a refuse cart, the corral comprising:
   a base having a first end and a second end;
   a first side fixture and a second side fixture arranged on opposing sides of the base;
   a lifting mechanism coupled to each side fixture, the lifting mechanisms configured to allow the corral to be lifted by a refuse truck;
   a cart retention structure coupled to a top surface of the base at a location between the first side fixture and the second side fixture, the cart retention structure including a recess configured to selectively receive a rear axle of a refuse cart; and
   a hinged member coupled to one of the side fixtures proximate the second end, the hinged member configured to be movable from an open position allowing a refuse cart to be installed in or removed from the retention corral, and a closed position configured to retain a refuse cart within the retention corral.

2. The retention corral of claim 1, further comprising a foot pedal coupled to the cart retention structure, the foot pedal movable between an open position and a closed position, wherein in the closed position the foot pedal is configured to secure the refuse cart to the retention structure.

3. The retention corral of claim 1, further comprising a middle fixture coupled to the base at a location equidistant from each of the first and second side fixtures.

4. The retention corral of claim 3, further comprising a refuse cart locking mechanism coupled to the middle fixture, the refuse cart locking mechanism movable between a locked position and an unlocked position.

5. The retention corral of claim 1, further comprising a generally horizontal beam between the first side fixture and the second side fixture, the horizontal beam arranged such that a portion of a frame of a refuse cart is positionable under the horizontal beam when the refuse cart is received in the corral.

6. The retention corral of claim 1, wherein the retention structure includes a recess configured to receive a rear portion of a frame of the refuse cart.

7. The retention corral of claim 1, wherein the lifting mechanism comprises fork pockets, the fork pockets configured to allow the corral to be lifted by a front load refuse truck.

8. A refuse cart system, comprising:
   a refuse cart including a frame, a bin coupled to the frame, and a pair of wheels coupled to an axle associated with the frame;
   a retention corral, including:
      a base having a first end and a second end;
      a first side fixture and a second side fixture arranged on opposing sides of the base;
      a lifting mechanism coupled to each side fixture, the lifting mechanisms configured to allow the corral to be lifted by a refuse truck;
      a cart retention structure coupled to a top surface of the base at a location between the first side fixture and the second side fixture, the cart retention structure including a recess configured to selectively receive the rear axle of the refuse cart; and
      a hinged member coupled to one of the side fixtures proximate the second end, the hinged member configured to be movable from an open position allowing the refuse cart to be installed in or removed from the retention corral, and a closed position configured to retain the refuse cart within the retention corral.

9. The refuse cart system of claim 8, further comprising a foot pedal coupled to the cart retention structure, the foot pedal movable between an open position and a closed position, wherein in the closed position the foot pedal is configured to secure the refuse cart to the retention structure.

10. The refuse cart system of claim 8, further comprising a middle fixture coupled to the base at a location equidistant from each of the first and second side fixtures.

11. The refuse cart system of claim 10, further comprising a refuse cart locking mechanism coupled to the middle fixture, the refuse cart locking mechanism movable between a locked position and an unlocked position.

12. The refuse cart system of claim 8, further comprising a generally horizontal beam between the first side fixture and the second side fixture, the horizontal beam arranged such that a portion of the frame of the refuse cart is positionable under the horizontal beam when the refuse cart is received in the corral.

13. The refuse cart system of claim 8, wherein the retention structure includes a recess configured to receive a rear portion of a frame of the refuse cart.

14. The refuse cart system of claim 8, wherein the lifting mechanism comprises fork pockets, the fork pockets configured to allow the corral to be lifted by a front load refuse truck.

* * * * *